US011901106B2

(12) United States Patent
Aoki et al.

(10) Patent No.: US 11,901,106 B2
(45) **Date of Patent: *Feb. 13, 2024**

(54) WIRE-WOUND COIL ELEMENT

(71) Applicant: TAIYO YUDEN CO., LTD., Tokyo (JP)

(72) Inventors: Hidenori Aoki, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/751,097

(22) Filed: May 23, 2022

(65) Prior Publication Data

US 2022/0285067 A1 Sep. 8, 2022

Related U.S. Application Data

(63) Continuation of application No. 15/861,203, filed on Jan. 3, 2018, now Pat. No. 11,367,553.

(30) Foreign Application Priority Data

Feb. 3, 2017 (JP) ................................ 2017-018390

(51) Int. Cl.
*H01F 17/04* (2006.01)
*H01F 27/02* (2006.01)
(Continued)

(52) U.S. Cl.
CPC ........... *H01F 17/045* (2013.01); *B65H 75/18* (2013.01); *H01F 5/02* (2013.01); *H01F 17/0033* (2013.01);
(Continued)

(58) Field of Classification Search
CPC .. H01F 17/045; H01F 27/027; H01F 17/0033; H01F 5/02; H01F 27/292;
(Continued)

(56) References Cited

U.S. PATENT DOCUMENTS 6,154,112 A 11/2000 Aoba
6,157,283 A 12/2000 Tsunemi
(Continued)

FOREIGN PATENT DOCUMENTS

EP 762535 B1 * 11/1998 ....... G06K 19/07749
JP S58-147221 U 10/1983
(Continued)

OTHER PUBLICATIONS

Notice of Reasons for Refusal dated Apr. 6, 2021, issued in corresponding Japanese Patent Application No. 2017-018390, with English translation.
(Continued)

*Primary Examiner* — Shawki S Ismail
*Assistant Examiner* — Kazi S Hossain
(74) *Attorney, Agent, or Firm* — Pillsbury Winthrop Shaw Pittman, LLP

(57) ABSTRACT

A coil element according to one embodiment of the present invention has a rectangular parallelepiped shape and has a principal surface including long sides and short sides. The coil element includes a drum core, a winding wound around the drum core, a first external electrode, a second external, and a covering portion covering at least a part of the winding core. The drum core in the embodiment includes a first flange, a second flange, and a winding core connecting between the first flange and the second flange. The winding core extends along the short sides of the principal surface. In one embodiment, the coil element has a height less than 0.85 mm.

20 Claims, 27 Drawing Sheets

(51) Int. Cl.
*B65H 75/18* (2006.01)
*H01F 17/00* (2006.01)
*H01F 5/02* (2006.01)
*H01F 27/29* (2006.01)
*H01F 41/086* (2016.01)

(52) U.S. Cl.
CPC ......... *H01F 27/027* (2013.01); *H01F 27/292* (2013.01); *H01F 41/086* (2016.01)

(58) Field of Classification Search
CPC ...... H01F 41/086; H01F 17/00; H01F 27/255; H01F 27/2828; H01F 2017/0093; B65H 75/18
USPC ........................................... 336/83, 221, 192
See application file for complete search history.

(56) References Cited

U.S. PATENT DOCUMENTS

| | | | | |
|---|---|---|---|---|
| 6,825,748 | B1 * | 11/2004 | Ibata | H03H 7/0115 336/200 |
| 2005/0212643 | A1 | 9/2005 | Kuroiwa et al. | |
| 2007/0188281 | A1 | 8/2007 | Iguchi et al. | |
| 2007/0193022 | A1 | 8/2007 | Kuroiwa et al. | |
| 2008/0309445 | A1 | 12/2008 | Suzuki | |
| 2010/0109827 | A1 | 5/2010 | Asou et al. | |
| 2012/0274437 | A1 * | 11/2012 | Matsuura | C22C 38/34 336/221 |
| 2014/0104026 | A1 * | 4/2014 | Shiokawa | H01F 27/2828 336/192 |
| 2014/0354526 | A1 | 12/2014 | Kang | |
| 2015/0084731 | A1 | 3/2015 | Takagi | |
| 2015/0116070 | A1 * | 4/2015 | Arai | H01F 27/292 336/192 |
| 2016/0035482 | A1 * | 2/2016 | Aoki | H01F 17/045 336/192 |
| 2017/0263373 | A1 * | 9/2017 | Ashizawa | H01F 27/29 |
| 2017/0309386 | A1 | 10/2017 | Noya | |
| 2017/0365399 | A1 * | 12/2017 | Kobayashi | H01F 27/292 |
| 2019/0043657 | A1 | 2/2019 | Wakabayashi | |
| 2019/0259528 | A1 | 8/2019 | Aoki et al. | |

FOREIGN PATENT DOCUMENTS

| | | | |
|---|---|---|---|
| JP | S59-105305 | A | 6/1984 |
| JP | H03-126026 | U | 12/1991 |
| JP | H07-192924 | A | 7/1995 |
| JP | H09-153419 | A | 6/1997 |
| JP | H10-41155 | A | 2/1998 |
| JP | 2000-030952 | A | 1/2000 |
| JP | 2000-269049 | A | 9/2000 |
| JP | 2003-031420 | A | 1/2003 |
| JP | 2003-303720 | A | 10/2003 |
| JP | 2005-210055 | A | 8/2005 |
| JP | 2007-273532 | A | 10/2007 |
| JP | 2010-109267 | A | 5/2010 |
| JP | 2011-035147 | A | 2/2011 |
| JP | 2014-099501 | A | 5/2014 |
| JP | 2016-035972 | A | 3/2016 |
| JP | 2016-174058 | A | 9/2016 |
| JP | 2017-022372 | A | 1/2017 |
| TW | 200746191 | A | 12/2007 |
| TW | 201237894 | A | 9/2012 |

OTHER PUBLICATIONS

Office Action dated Nov. 17, 2020 issued in corresponding Japanese Patent Application No. 2017-018390, with English translation.
Non-final Office Action dated Mar. 14, 2019 issued in corresponding Taiwanese Patent Application No. 106136607 with English translation.
First Office Action Taiwanese Patent Application No. 106136607 dated May 22, 2018 with English translation.

* cited by examiner

WIRE-WOUND COIL ELEMENT

CROSS-REFERENCE TO RELATED APPLICATIONS

This application is a continuation application from U.S. patent application Ser. No. 15/861,203, filed on Jan. 3, 2018 based on and claims the benefit of priority from Japanese Patent Application Serial No. 2017-018390 (filed on Feb. 3, 2017), the contents of which are hereby incorporated by reference in their entirety.

TECHNICAL FIELD

The present invention relates to a wire-wound coil element having a winding wound around a drum core. More specifically, the present invention relates to a wire-wound coil element mounted on a circuit board in a horizontal position.

BACKGROUND

Electronic devices include various coil elements. Examples of the coil elements include an inductor and a transformer used to remove noise from a signal.

A wire-wound coil element has conventionally been known. A wire-wound coil element includes a drum core, a winding wound around the drum core, and a plurality of external electrodes electrically connected to ends of the winding. The drum core includes a pair of flanges and a winding core that connects the pair of flanges to each other. The winding is wound around the winding core. Between the pair of flanges, there is formed a resin layer so as to cover the winding wound around the winding core.

Wire-wound coil elements include vertically mounted ones and horizontally mounted ones. Vertically mounted coil elements are disclosed in, for example, Japanese Patent Application Publication No. 2014-99501, Japanese Patent Application Publication No. 2005-210055, and Japanese Patent Application Publication No. 2000-269049. As disclosed in these publications, a vertically mounted coil element is mounted on a circuit board in such a position that the axis of the winding core is perpendicular to the mounting surface.

On the other hand, horizontally mounted coil elements are disclosed in, for example, Japanese Patent Application Publication No. 2011-35147 and Japanese Patent Application Publication No. 2007-273532 ("the '532 Publication"). As disclosed in these publications, a horizontally mounted coil element is mounted on a circuit board in such a position that the axis of the winding core is parallel to the mounting surface.

As electronic devices are downsized, there are higher demands for a reduced thickness (or lower profile) of coil elements incorporated in the electronic components.

One way to reduce the thickness of a vertically mounted coil element is to reduce the thicknesses of the flanges. However, a flange having a reduced thickness is prone to be broken. Particularly when a coil element is mounted on a circuit board by a mounter, a large stress tends to act on the coil element in the vertical direction from the mounter to the circuit board. In a vertically mounted coil element, a flange having a reduced thickness is prone to be broken due to a stress acting in the direction perpendicular to the circuit board.

As shown in FIG. 4 of the '532 Publication, conventional horizontally mounted coil elements are arranged such that the winding core extends along the long sides of the coil element, so as to allow as many turns of the winding as possible. Simultaneously, a pair of flanges are provided on both longitudinal ends of the coil element. One way to reduce the thickness of a horizontally mounted coil element is to reduce the diameter of the winding core. However, when the winding core arranged along the long sides of the coil element has a reduced diameter, the winding core is prone to be broken by a stress.

A resin layer filled between the flanges also serve to reinforce the drum core. However, as a result of reduction of thickness of coil elements, the reinforcement by the resin layer is not enough to prevent breakage of the drum core.

Thus, there is a demand for a wire-wound coil element having a reduced thickness but is less prone to be broken. One object of the present invention is to provide a wire-wound coil element having a reduced thickness but is less prone to be broken. In particular, one object of the present invention is to provide a horizontally mounted coil element having a reduced thickness but is less prone to be broken. Other objects of the present invention will be apparent with reference to the entire description in this specification.

SUMMARY

The coil element according to an embodiment of the present invention has a rectangular parallelepiped shape and has a principal surface including long sides and short sides. The coil element includes a drum core, a winding wound around the drum core, a first external electrode electrically connected to one end of the winding, and a second external electrode electrically connected to the other end of the winding. The drum core in the embodiment includes a first flange, a second flange, and a winding core connecting between the first flange and the second flange. The winding core extends along the short sides of the principal surface.

In the coil element according to the embodiment, the axis of the winding core extends in the direction of the short sides of the principal surface. Therefore, the coil element is less subject to the stress from a mounter in mounting the coil element to a circuit board and damage of the winding core due to the bending stress received from the circuit board after mounting, as compared to conventional horizontally mounted coil elements in which the axis of a winding core extends in the direction of the long sides of the principal surface.

In an embodiment of the present invention, the thicknesses of the first flange and the second flange are larger in a direction perpendicular to the principal surface than in a direction parallel to an axis of the winding core. In the embodiment, the first flange and the second flange are less prone to be broken when a stress acts on the first flange and the second flange in the direction perpendicular to the mounting surface.

The coil element according to an embodiment of the present invention further includes a second winding wound around the winding core, a third external electrode electrically connected to one end of the second winding, and a fourth external electrode electrically connected to the other end of the second winding. In an embodiment of the present invention, each of the first external electrode and the third external electrode is provided on one end of the long sides of the principal surface, and each of the second external electrode and the fourth external electrode is provided on the other end of the long sides of the principal surface. The coil element according to the embodiment can be used as a common mode choke coil.

The coil element according to an embodiment of the present invention further includes a covering portion that covers at least a part of the first winding. The covering portion may cover at least a part of the drum core. The covering portion may cover at least a part of the second winding.

In an embodiment of the present invention, the distance between an outer periphery of the winding core and the first flange in a height direction of the coil element is equal to the distance between the outer periphery of the winding core and the first flange in a width direction of the coil element. In the embodiment, the winding (and the second winding) can be efficiently arranged in a region between the first flange and the second flange.

In the coil element according to an embodiment of the present invention, both the first external electrode and the second external electrode are provided on the first flange. In an embodiment of the present invention, the first external electrode is provided on one end of the first flange in a direction parallel to the long sides, and the second external electrode is provided on the other end of the first flange in the direction parallel to the long sides. In these embodiments, both ends (the initial end portion and the terminal end portion) of the winding can be positioned on one of the pair of flanges of the drum core (that is, the first flange). Thus, the winding can be wound around the winding core to form an even number of stacked layers (two layers, four layers, six layers . . . ).

In the coil element according to an embodiment of the present invention, the first external electrode is provided on the first flange, and the second external electrode is provided on the second flange. In an embodiment of the present invention, the first flange has a first end and a second end opposed to each other in the direction parallel to the long sides, the second flange has a third end and a fourth end opposed to each other in the direction parallel to the long sides, the first flange and the second flange are arranged such that the first end and the third end are opposed to each other and the second end and the fourth end are opposed to each other. In the embodiment, the first external electrode is provided on the first end of the first flange, and the second external electrode is provided on the fourth end of the second flange. In another embodiment of the present invention, the first external electrode is provided on the first end of the first flange, and the second external electrode is provided on the third end of the second flange. In the coil element according to the embodiment, the winding can be wound around the winding core to form an odd number of stacked layers (one layer, three layers, five layers . . . ).

Advantages

Various embodiments of the invention disclosed herein will provide a wire-wound coil element having a reduced thickness but is less prone to be broken.

DESCRIPTION OF THE PREFERRED EMBODIMENTS

Various embodiments of the invention will be described hereinafter with reference to the drawings. Elements common to a plurality of drawings are denoted by the same reference signs throughout the plurality of drawings. It should be noted that the drawings do not necessarily appear in accurate scales, for convenience of description.

Figure 1:
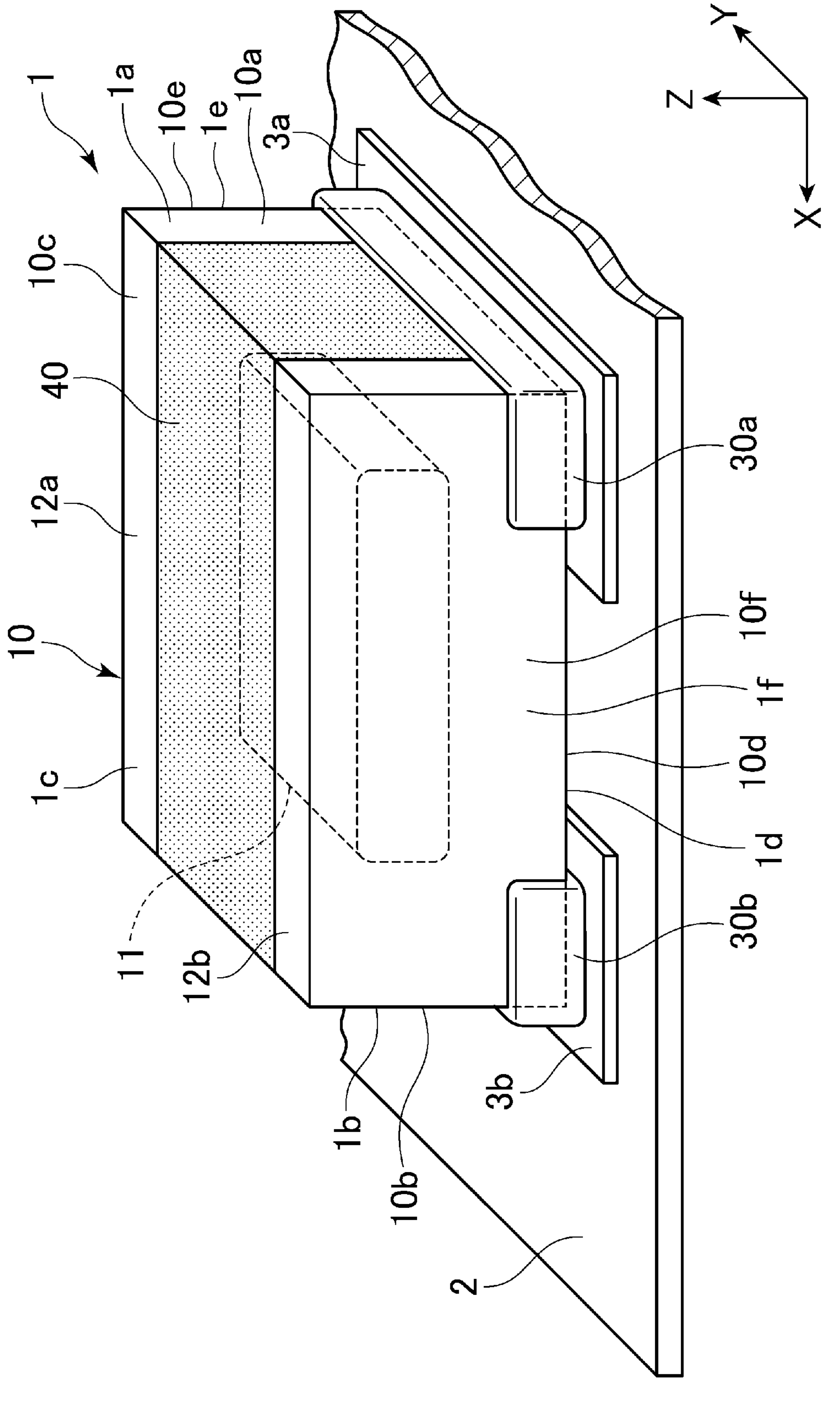
FIG. 1 is a perspective view showing a coil element according to one embodiment of the present invention.
Figure 2:
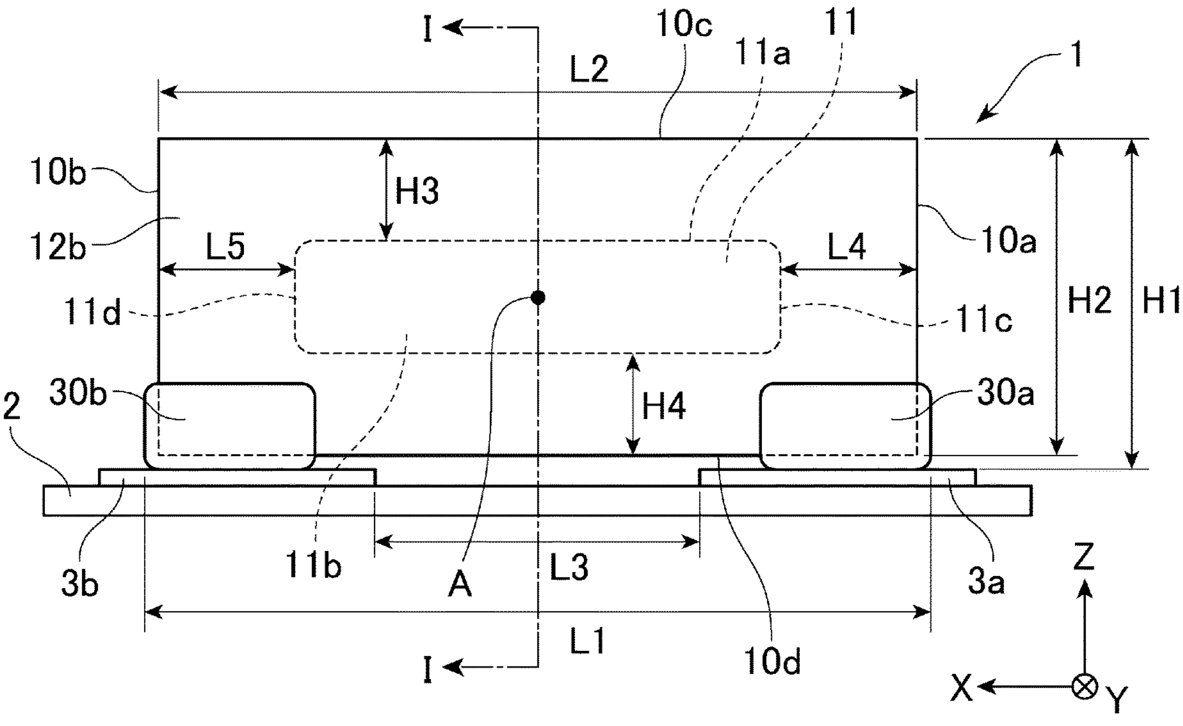
FIG. 2 is a front view of the coil element shown in FIG. 1.
Figure 3:
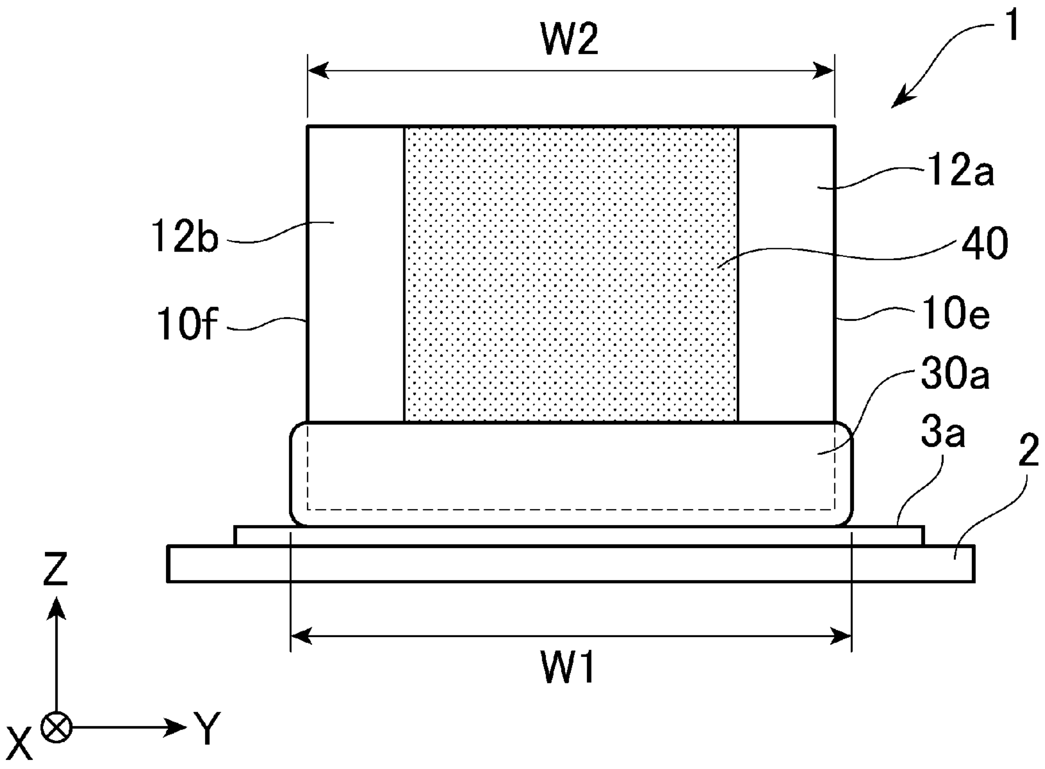
FIG. 3 is a right side view of the coil element shown in FIG. 1.
Figure 4:
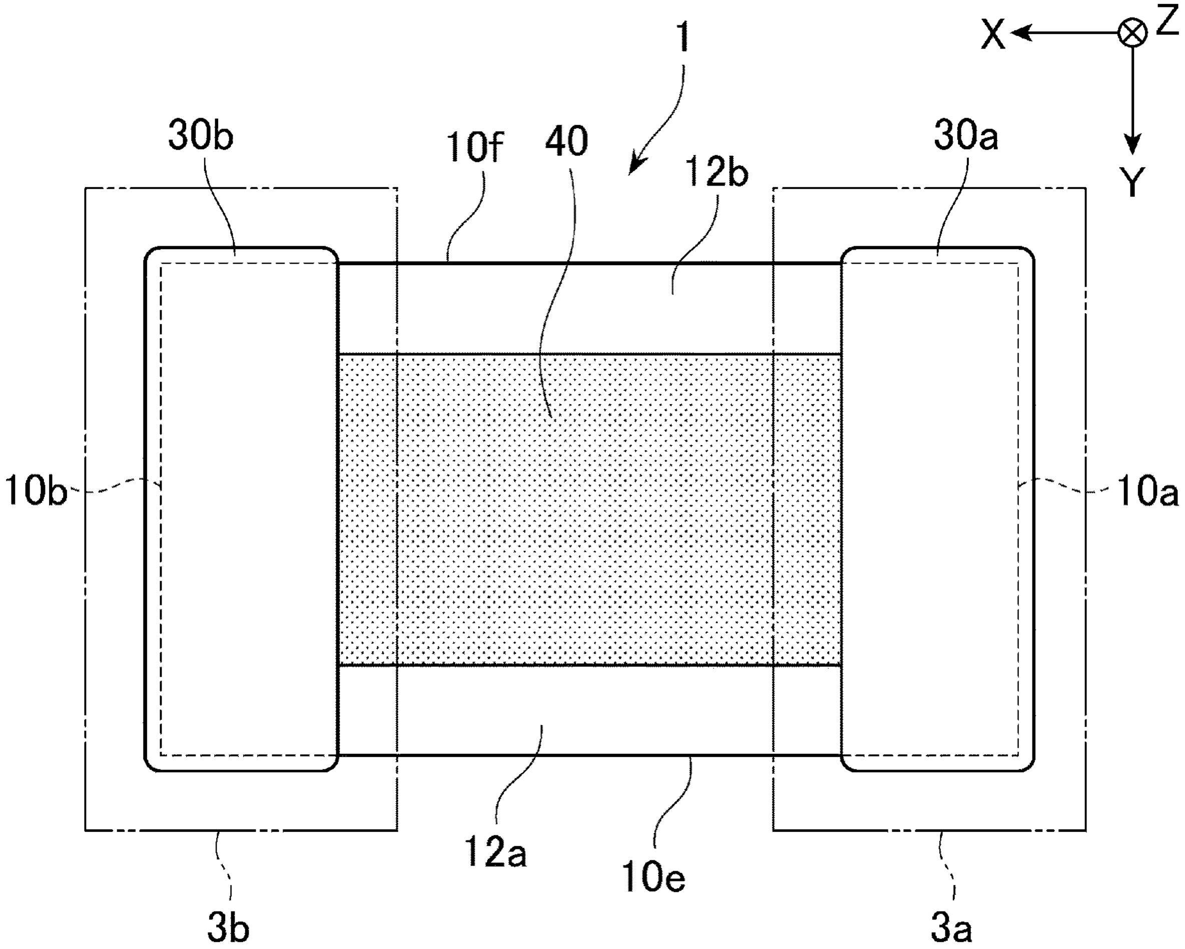
FIG. 4 is a bottom view of the coil element shown in FIG. 1.
Figure 5:
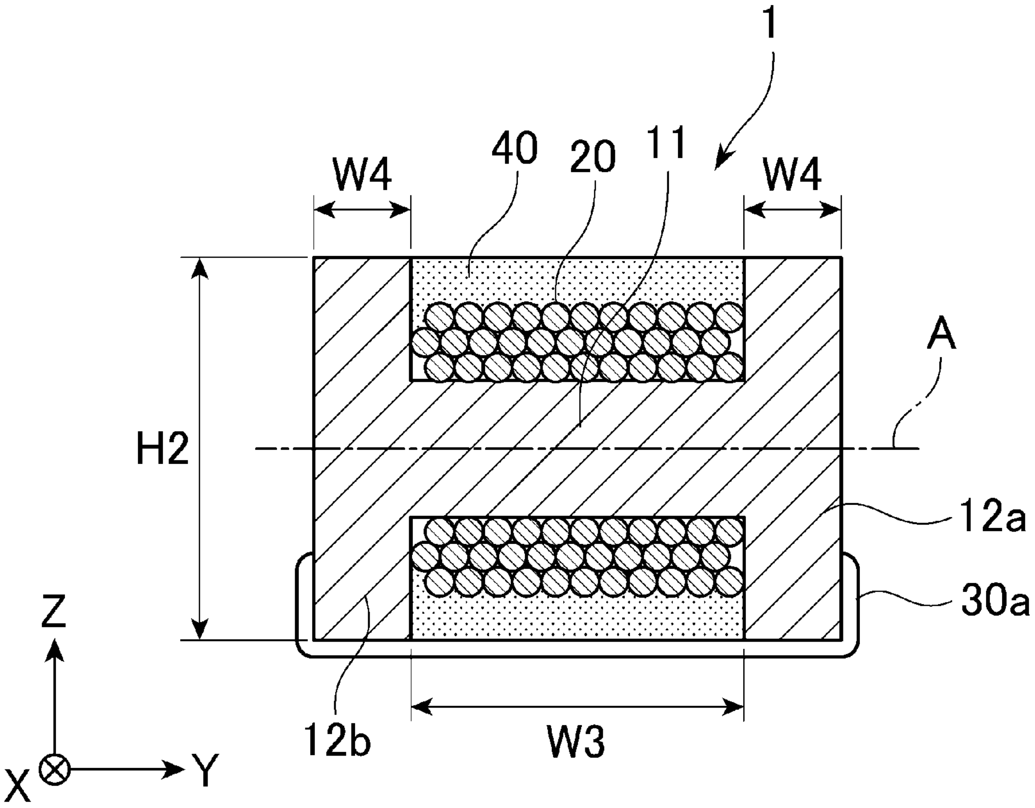
FIG. 5 is a sectional view of the coil element shown in FIG. 2 cut along a plane including the line I-I.
Figure 6:
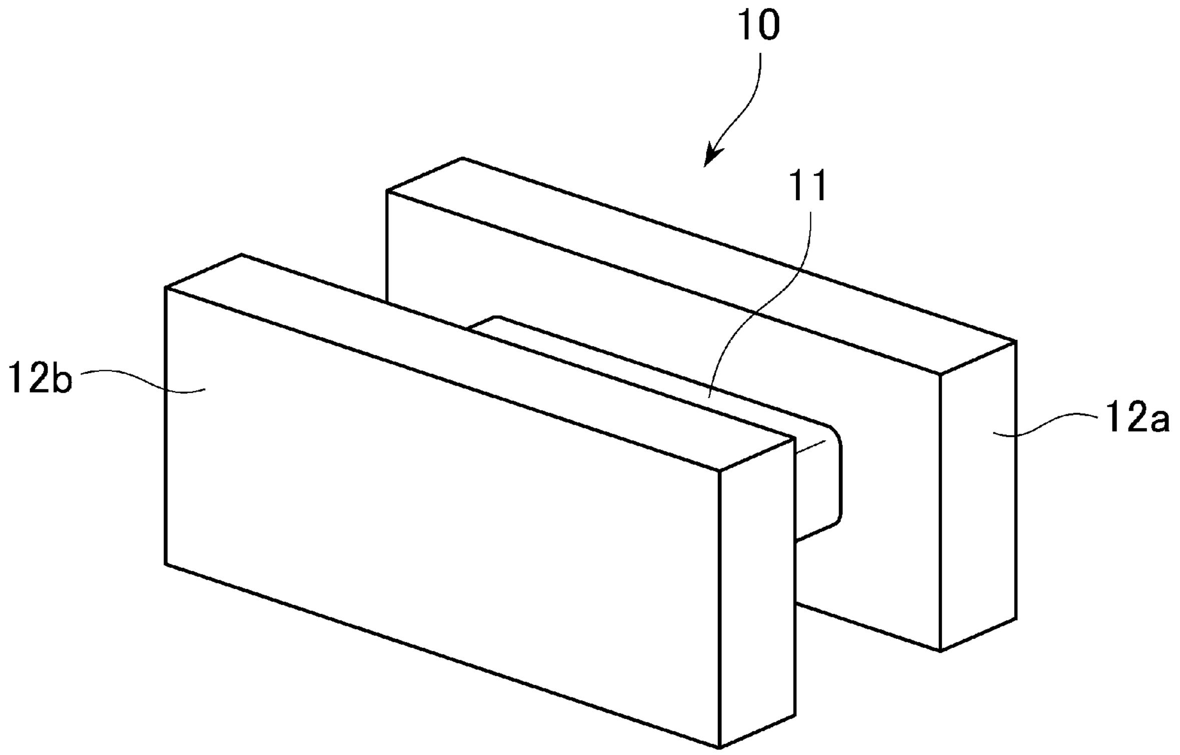
FIG. 6 is a perspective view of the drum core shown in FIG. 1.

FIG. 1 is a perspective view showing a coil element according to one embodiment of the present invention; FIG. 2 is a front view of the same; FIG. 3 is a right side view of the same; FIG. 4 is a bottom view of the same; and FIG. 5 is a sectional view of the coil element shown in FIG. 2 cut along a plane including the line I-I.

The coil element 1 of the embodiment shown is mounted to the circuit board 2 via a first land portion 3*a* and a second land portion 3*b*. This coil element 1 is, for example, an inductor used to remove noise in an electronic circuit. The coil element 1 is either a power inductor to be incorporated in a power supply line or an inductor used in a signal line.

FIG. 1 shows the direction X, direction Y, and direction Z perpendicular to one another. The orientation and arrangement of the constituent members of the coil element 1 may be herein described on the basis of the direction X, direction Y, and direction Z shown in FIG. 1. More specifically, the direction in which the axis A of the winding core 11 extends is the direction Y, and the direction perpendicular to the axis A of the winding core 11 and parallel to the mounting surface of the circuit board 2 is the direction X. The direction perpendicular to the direction X and the direction Y is the direction Z. In this specification, the direction X may be referred to as the lengthwise direction of the coil element 1, the direction Y may be referred to as the widthwise direction of the coil element 1, and the direction Z may be referred to as the height direction of the coil element 1.

The coil element 1 according to one embodiment of the present invention has a rectangular parallelepiped shape. The coil element 1 has a first end surface 1*a*, a second end surface 1*b*, a first principal surface 1*c* (top surface 1*c*), a second principal surface 1*d* (bottom surface 1*d*), a first side surface 1*e*, and a second side surface 1*f*. More specifically, the first end surface 1*a* is an end surface of the coil element 1 in the negative direction of the axis X, the second end surface 1*b* is an end surface of the coil element 1 in the positive direction of the axis X, the first principal surface 1*c* is an end surface of the coil element 1 in the positive direction of the axis Z, the second principal surface 1*d* is an end surface of the coil element 1 in the negative direction of the axis Z, the first side surface 1*e* is an end surface of the coil element 1 in the positive direction of the axis Y, and the second side surface 1*f* is an end surface of the coil element 1 in the negative direction of the axis Y.

Each of the first end surface 1*a*, the second end surface 1*b*, the first principal surface 1*c*, the second principal surface 1*d*, the first side surface 1*e*, and the second side surface 1*f* is either a flat surface or a curved surface. Further, the eight corners of the coil element 1 may be rounded. Thus, even when a part of the first end surface 1*a*, the second end surface 1*b*, the first principal surface 1*c*, the second principal surface 1*d*, the first side surface 1*e*, and the second side surface 1*f* of the coil element 1 is curved or the corners of the coil element 1 are rounded, the shape of the coil element 1 may be herein referred as to "a rectangular parallelepiped shape." That is, the terms "rectangular parallelepiped" and "rectangular parallelepiped shape" used herein do not refer to "rectangular parallelepiped" in a mathematically strict meaning.

As shown, the coil element 1 includes a drum core 10, a winding 20, a first external electrode 30*a*, a second external electrode 30*b*, and a resin portion 40.

The drum core 10 includes the winding core 11 extending in a direction parallel to the mounting surface of the circuit board 2, a flange 12*a* having a rectangular parallelepiped shape and provided on one end of the winding core 11, and a flange 12*b* having a rectangular parallelepiped shape and provided on the other end of the winding core 11. Thus, the winding core 11 connects the flange 12*a* and the flange 12*b*. The flange 12*a* and the flange 12*b* are arranged such that the inside surfaces of these flanges are opposed to each other. In each of the flange 12*a* and the flange 12*b*, the inside surface, the outside surface, and the four surfaces connecting between the inside surface and the outside surface are either flat surfaces or curved surfaces. Further, the eight corners may be rounded. Thus, even when the flange 12*a* and the flange 12*b* have a curved surface or the corners of the flanges are rounded, the shape of the flanges may be herein referred as to "a rectangular parallelepiped shape." That is, the terms "rectangular parallelepiped" and "rectangular parallelepiped shape" used herein do not refer to "rectangular parallelepiped" in a mathematically strict meaning.

Both the outside surface of the flange 12*a* opposed to the inside surface of the same and the outside surface of the flange 12*b* opposed to the inside surface of the same constitute a part of the outer surface of the coil element 1. The flange 12*a* and the flange 12*b* may be partially or entirely covered with the resin portion 40. In this case, the outer surface of the resin portion 40 constitutes a part of the outer surface of the coil element.

In the flange 12*a* and the flange 12*b*, the inside surfaces and the outside surfaces thereof extend perpendicularly to the axis A of the winding core 11. The terms "vertical," "perpendicular," and "parallel" are not used herein in a mathematically strict meaning. For example, when it is described that the inside surface of the flange 12*a* extends in a direction perpendicular to the axis A of the winding core 11, the angle between the outside surface of the flange 12*a* and the axis A of the winding core 11 may be about 90° in addition to just 90°. The range of the angle being about 90° may include any angle within the range of 70 to 110°, 75 to 105°, 80 to 100°, or 85 to 95°. Likewise, the terms "parallel," "vertical," and other words that are included in this specification and can be interpreted in a mathematically strict meaning are also susceptible of wider interpretation than the mathematically strict meanings thereof in light of the purport and context of the present invention and the technical common knowledge.

The shape of the flange 12*a* and the flange 12*b* that can be applied to the present invention is not limited to the rectangular parallelepiped shape, and the flange 12*a* and the flange 12*b* can have various shapes. In an embodiment, the flange 12*a* and the flange 12*b* may have a cutout in one or both corners thereof. The ends 20*a*, 20*b* of the winding 20 (described later) can be bonded to the cutout by thermo-compression bonding.

The drum core 10 has a first end surface 10*a*, a second end surface 10*b*, a first principal surface 10*c* (top surface 10*c*), a second principal surface 10*d* (bottom surface 10*d*), a first side surface 10*e*, and a second side surface 10*f*. More specifically, the first end surface 10*a* is an end surface of the drum core 10 in the negative direction of the axis X, the second end surface 10*b* is an end surface of the drum core 10 in the positive direction of the axis X, the first principal surface 10*c* is an end surface of the drum core 10 in the positive direction of the axis Z, the second principal surface 10*d* is an end surface of the drum core 10 in the negative direction of the axis Z, the first side surface 10*e* is an end surface of the drum core 10 in the positive direction of the axis Y, and the second side surface 10*f* is an end surface of the drum core 10 in the negative direction of the axis Y. The first end surface 10*a*, the second end surface 10*b*, the first principal surface 10*c*, the second principal surface 10*d*, the first side surface 10*e*, and the second side surface 10*f* constitute a part of the first end surface 1*a*, the second end surface 1*b*, the first principal surface 1*c*, the second principal surface 1*d*, the first side surface 1*e*, and the second side surface 1*f* of the coil element 1, respectively.

Figure 7:
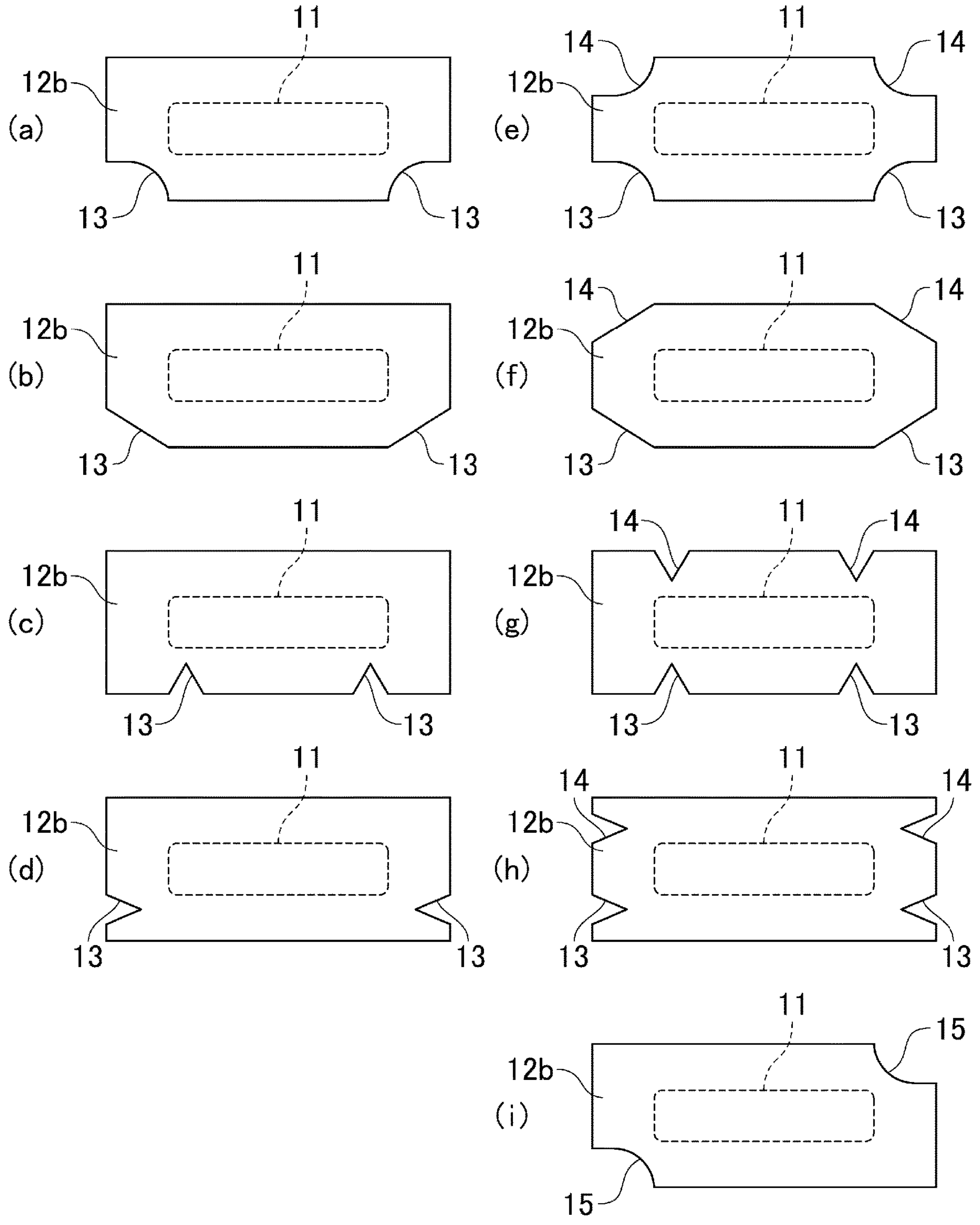
FIG. 7 is a schematic view showing variations of the flange of the drum core.

FIG. 7 is a schematic view showing variations of the flange 12*b*. As shown in Parts (a) to (i) of FIG. 7, the flange 12*b* can have various cutouts formed therein. As shown in Parts (a) to (d) of FIG. 7 for example, the flange 12*b* has a pair of cutouts 13 arranged symmetrically in the widthwise direction (direction X). In another embodiment, as shown in Parts (e) to (h) of FIG. 7, the flange 12*b* may have another pair of cutouts 14 arranged symmetrically in the widthwise direction (direction X), in addition to the pair of cutouts 13. The flange 12*b* shown in Parts (e) to (h) of FIG. 7 having four cutouts is used in, for example, a four-terminal coil element having two windings (described later).

The cutouts formed in the flange 12*b* may have various shapes and may be arranged in various positions. For example, as shown in Part (a) of FIG. 7, the cutouts 13 are formed in a curved shape at the lower corners of the flange 12*b*. In another embodiment, as shown in Part (b) of FIG. 7, the cutouts 13 may be formed to have a flat surface at the lower corners of the flange 12*b*. In still another embodiment, as shown in Part (c) of FIG. 7, the cutouts 13 may be formed in a V-shape in the lower surface of the flange 12*b* that constitutes a part of the lower surface 10*c* of the drum core 10. In still another embodiment, as shown in Part (d) of FIG. 7, the cutouts 13 may be formed in a V-shape in both side surfaces of the flange 12*b* that constitute a part of the side surface 10*a* and a part of the side surface 10*b* of the drum core 10.

As shown in Part (e) of FIG. 7, for example, the cutouts 14 are formed in a curved shape at the upper corners of the flange 12*b*, in addition to the cutouts 13. In still another embodiment, as shown in Part (f) of FIG. 7, the cutouts 14 may be formed to have a flat surface at the upper corners of the flange 12*b*, in addition to the cutouts 13. In still another embodiment, as shown in Part (g) of FIG. 7, the cutouts 14 may be formed in a V-shape in the top surface of the flange 12*b* that constitutes a part of the top surface 10*c* of the drum core 10, in addition to the cutouts 13. In still another embodiment, as shown in Part (h) of FIG. 7, the cutouts 14 may be formed in a V-shape in both side surfaces of the flange 12*b* that constitute a part of the side surface 10*a* and a part of the side surface 10*b* of the drum core 10, in addition to the cutouts 13.

In still another embodiment, as shown in Part (i) of FIG. 7, the flange 12*b* may have a pair of cutouts 15 arranged point-symmetrically with respect to the winding core 11.

The flange 12*a* may be formed in the same shape as the flange 12*b*.

The shapes and the arrangement of the cutouts described above are mere examples. The flange 12*b* that can be applied to the present invention can have cutouts shaped and arranged variously, in addition to those shown in the drawing.

In the embodiment shown, the winding core 11 has a generally quadrangular prism shape. The winding core 11 may have any shape suited for winding the winding 20 thereon. For example, the winding core 11 may have a polygonal prism shape such as a triangular prism shape, a pentagonal prism shape, and a hexagonal prism shape, a cylindrical shape, an elliptic cylindrical shape, or a truncated conical shape.

The drum core 10 is made of a magnetic material or a non-magnetic material. The magnetic material used for the drum core 10 is, for example, ferrite or a soft magnetic alloy material. The non-magnetic material used for the drum core 10 is, for example, alumina or glass. The magnetic material used for the drum core 10 may be various crystalline or amorphous magnetic alloy material, or a combination of a crystalline material and an amorphous material. The crystalline magnetic alloy material used as a magnetic material for the drum core 10 is composed mainly of Fe for example, and contains one or more elements selected from the group consisting of Si, Al, Cr, Ni, Ti, and Zr. The amorphous magnetic alloy material used as a magnetic material for the drum core 10 contains, for example, B or C, in addition to any one of Si, Al, Cr, Ni, Ti, and Zr. The magnetic material used for the drum core 10 may be a pure iron composed of Fe and inevitable impurities. The magnetic material used for the drum core 10 may be a combination of the pure iron composed of Fe and inevitable impurities and various crystalline or amorphous magnetic alloy material. The materials of the drum core 10 are not limited to those explicitly named herein, and any material known as a material for a drum core can be used.

The drum core 10 is produced by, for example, mixing powder of the magnetic material or the non-magnetic material described above with a lubricant, filling the mixed material into a cavity of a mold, pressing the mixed material to prepare a green compact, and sintering the green compact. Further, the drum core 10 can also be produced by mixing the powder of the magnetic material or the non-magnetic material described above with a resin, a glass, or an insulating oxide (e.g., Ni—Zn ferrite or silica), molding the mixed material, and hardening or sintering the mixed material.

The winding 20 is wound around the winding core 11. The winding 20 is composed of a lead wire made of a metal material having an excellent electric conductivity and an insulating film coating the lead wire. The metal material used for the winding 20 may be one or more of Cu (copper), Al (aluminum), Ni (nickel), and Ag (silver), or an alloy containing any one of these metals.

At least one of the flange 12*a* and the flange 12*b* has external electrodes provided on both ends thereof in the direction X. The external electrodes are provided to either one or both of the flange 12*a* and the flange 12*b*. In FIG. 1, the external electrodes are provided to both the flange 12*a* and the flange 12*b*.

In an embodiment of the present invention, the flange 12*a* and the flange 12*b* are configured such that the length L2 of these flanges in the direction X (that is, the length of the long sides of the principal surface 1*c* and the principal surface 1*d*) is larger than the distance L3 between the land portion 3*a* and the land portion 3*b*. Thus, the external electrodes provided on the ends of the flange 12*a* and the flange 12*b* in the direction X can be arranged at positions that correspond to the land portion 3*a* and the land portion 3*b* in a plan view. In the example shown in FIG. 1, the external electrode 30*a* provided on the ends of the flange 12*a* and the flange 12*b* in the negative direction of the axis X is arranged at a position that corresponds to the land portion 3*a* in a plan view, and the external electrode 30*b* provided on the ends of the flange 12*a* and the flange 12*b* in the positive direction of the axis X is arranged at a position that corresponds to the land portion 3*b* in a plan view, More specifically, in the embodiment shown in FIG. 1, the external electrode 30*a* is provided on the end of the flange 12*a* in the negative direction of the axis X, and the external electrode 30*a* extends to the end of the flange 12*b* in the negative direction of the axis X. That is, the external electrode 30*a* is also provided on the end of the flange 12*b* in the negative direction of the axis X. On the other hand, the external electrode 30*b* is provided on the end of the flange 12*a* in the positive direction of the axis X, and the external electrode 30*b* extends to the end of the flange 12*b* in the positive direction of the axis X. That is, the external electrode 30*b* is also provided on the end of the flange 12*b* in the positive direction of the axis X.

In an embodiment of the present invention, the coil element 1 is mounted to the circuit board 2 by joining the external electrode 30*a* to the land portion 3*a* and joining the external electrode 30*b* to the land portion 3*b*. The external electrode 30*a* and the external electrode 30*b* are joined with solder to the land portion 3*a* and the land portion 3*b*, respectively. Thus, the external electrode 30*a* is electrically connected to the land portion 3*a*, and the external electrode 30*b* is electrically connected to the land portion 3*b*.

In an embodiment of the present invention, the external electrode 30*a* covers the following portions of the drum core 10: the end of the bottom surface 10*d* in the negative direction of the axis X, a region in the end surface 10*a* below a predetermined level, and regions in the ends of the side surface 10*e* and the side surface 10*f* in the negative direction of the axis X below a predetermined level. Likewise, the external electrode 30*b* covers the following portions of the drum core 10: the end of the bottom surface 10*d* in the positive direction of the axis X, a region in the end surface 10*b* below a predetermined level, and regions in the ends of the side surface 10*e* and the side surface 10*f* in the positive direction of the axis X below a predetermined level.

Figure 8:
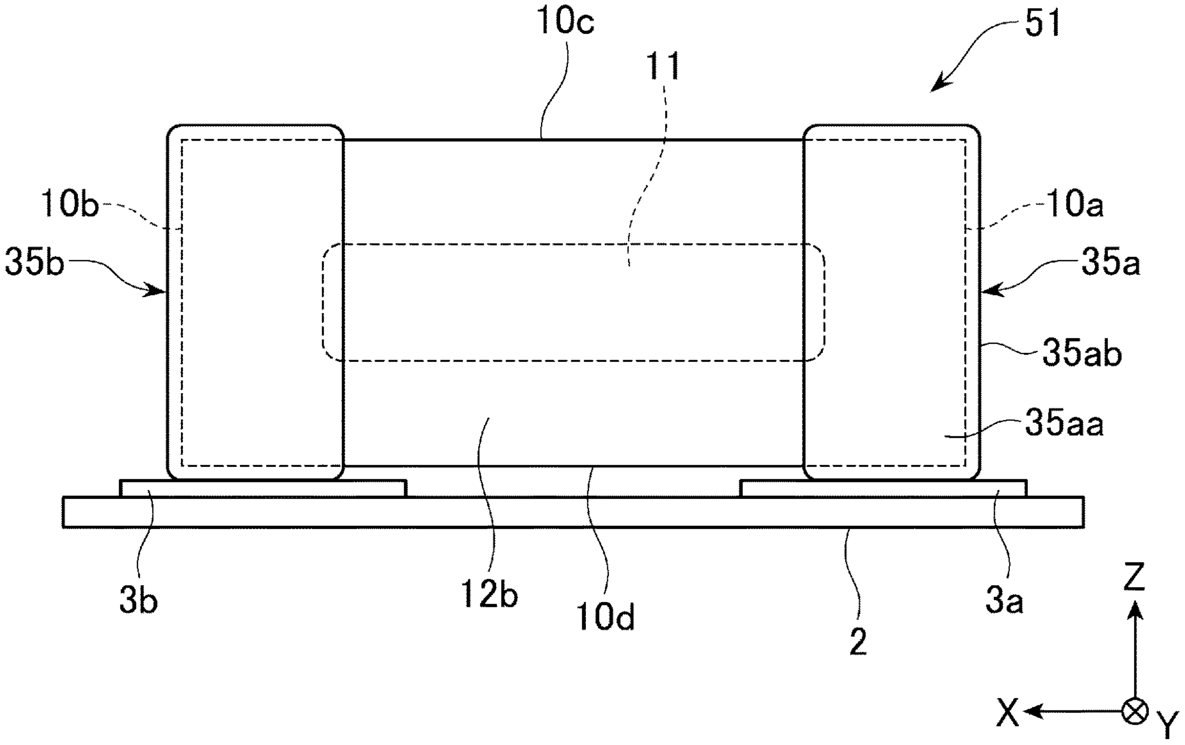
FIG. 8 is a front view showing a coil element according to another embodiment of the present invention.
Figure 9:
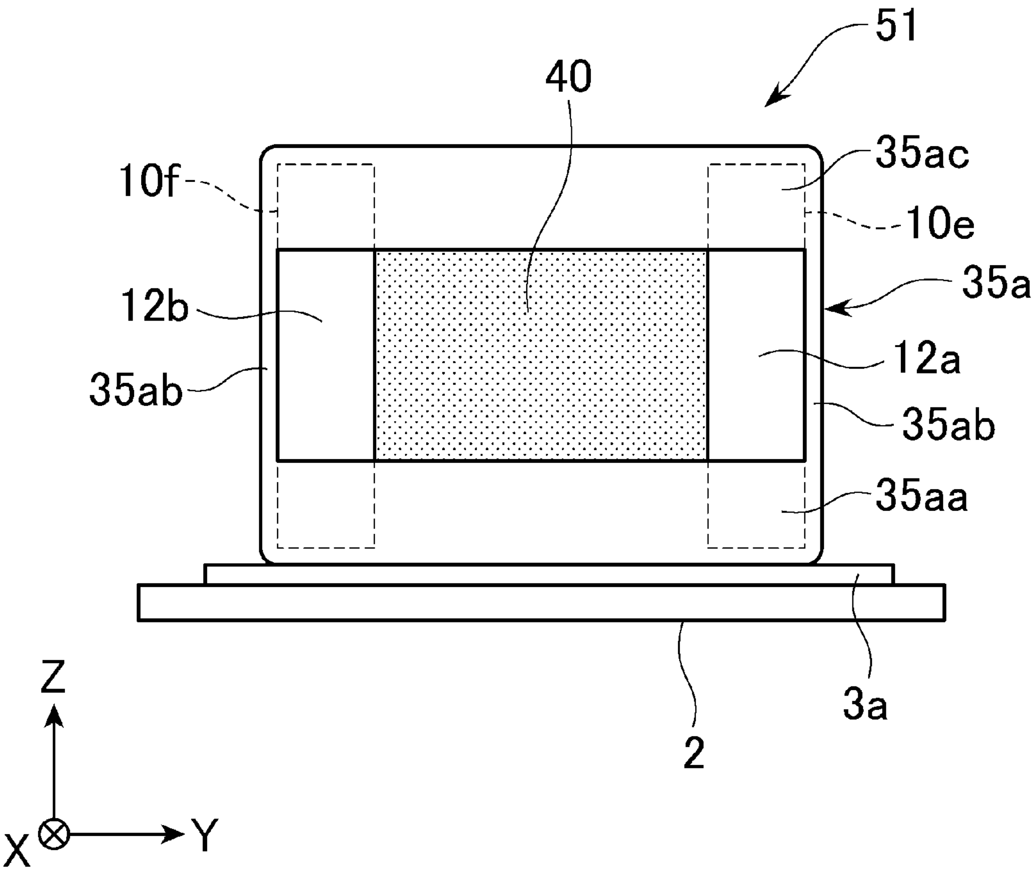
FIG. 9 is a right side view of the coil element shown in FIG. 8.
Figure 10:
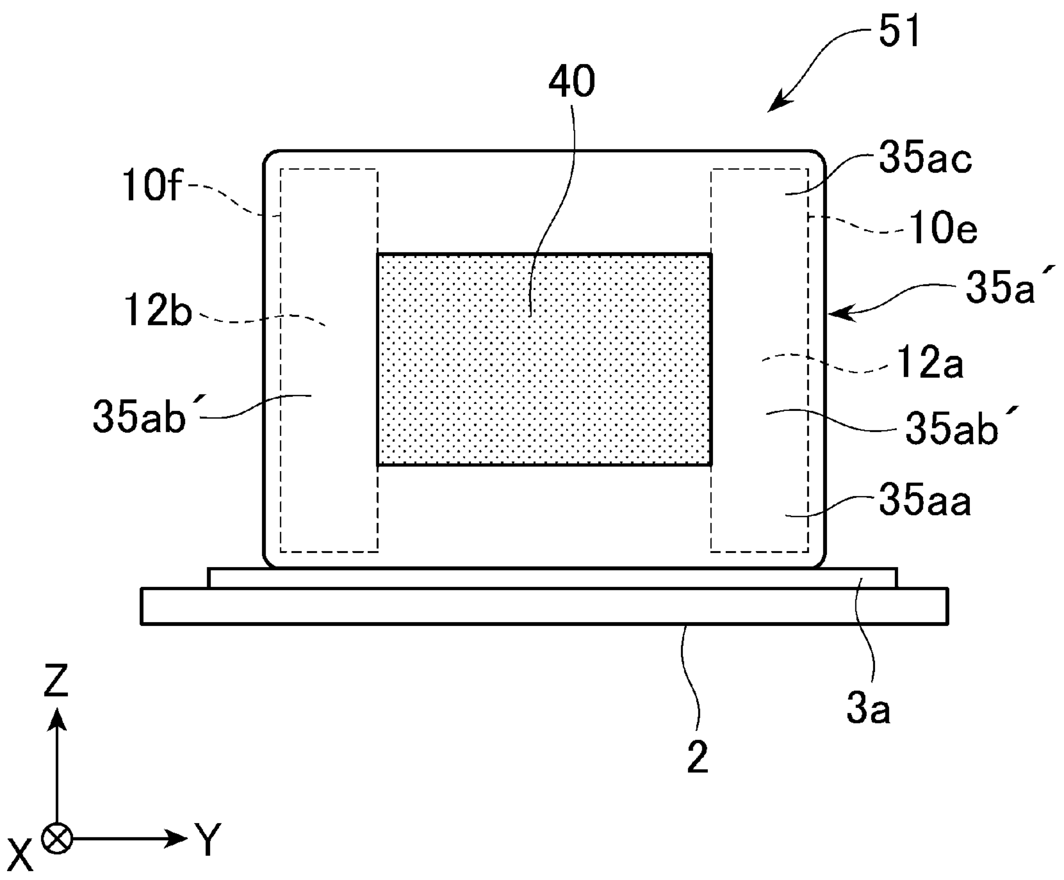
FIG. 10 is a right side view showing a coil element according to still another embodiment of the present invention.

The shapes and the arrangement of the external electrode 30*a* and the external electrode 30*b* shown are mere examples. The external electrode 30*a* and the external electrode 30*b* can be shaped and arranged variously. Variations of the external electrodes that can be applied to the present invention will be hereinafter described with reference to FIGS. 8 to 10. FIG. 8 is a front view showing a coil element according to another embodiment of the present invention, and FIG. 9 is a right side view of the coil element shown in FIG. 8. FIG. 10 is a right side view showing a coil element according to still another embodiment of the present invention.

As shown in FIGS. 8 and 9, the coil element 51 according to the other embodiment of the present invention includes an external electrode 35*a* instead of the external electrode 30*a* of the coil element 1, and includes an external electrode 35*b* instead of the external electrode 30*b*. The external electrode 35*a* includes a bottom portion 35*aa*, a top portion 35*ac*, and a connection portion 35*ab* that connects between the bottom portion 35*aa* and the top portion 35*ac*. The bottom portion 35*aa* is formed in the same manner as the external electrode 30*a* shown in FIG. 2. That is, the bottom portion 35*aa* covers the following portions of the drum core 10: the end of the bottom surface 10*d* in the negative direction of the axis X, a lower portion of the end surface 10*a*, and lower portions of the ends of the side surface 10*e* and the side surface 10*f* in the negative direction of the axis X.

The top portion 35*ac* covers the following portions of the drum core 10: the end of the top surface 10*c* in the negative direction of the axis X, an upper portion of the end surface 10*a*, and upper portions of the ends of the side surface 10*e* and the side surface 10*f* in the negative direction of the axis X.

The connection portion 35*ab* extends, in the end of the side surface 10*e* in the negative direction of the axis X and the end of the side surface 10*f* in the negative direction of the axis X, from the upper end of the bottom portion 35*aa* to the lower end of the top portion 35*ac*. As shown in FIG. 10, in both ends of the end surface 10*a* in the direction Y, the bottom portion 35*aa* and the top portion 35*ac* may be connected by connection portions 35*ab*' that extends from the upper end of the bottom portion 35*aa* to the lower end of the top portion 35*ac*.

The external electrode 35*b* is formed symmetrically to the external electrode 35*a* in the direction of axis X. Detailed description of the external electrode 35*b* will be omitted.

Thus, the coil element 51 has the external electrodes on both the top surface 1*c* and the bottom surface 1*d* thereof, and therefore, both the top surface 1*c* and the bottom surface 1*d* can serve as a mounting surface. That is, when the coil element 51 is mounted to the circuit board 2, either the bottom portion 35*aa* or the top portion 35*ac* is joined to the land portion 3*a*.

In an embodiment of the present invention, each of the external electrode 30*a* and the external electrode 30*b* includes a base electrode and a plating layer covering the base electrode. The base electrode is formed by, for example, applying an electrically conductive material (e.g., silver) in a paste form to the surface of the drum core 10 by dipping, and drying the applied electrically conductive material. The plating layer formed on the base electrode includes two layers, that is, for example, a nickel plating layer and a tin plating layer formed on the nickel plating layer. The external electrode 30*a* and the external electrode 30*b* may be formed by sputtering or vapor deposition.

One end of the winding 20 is electrically connected to the external electrode 30*a*, and the other end of the winding 20 is electrically connected to the external electrode 30*b*.

As described above, the external electrode 30*a* extends from the end of the flange 12*b* in the negative direction of the axis X to the end of the flange 12*a* in the negative direction of the axis X, and the external electrode 30*b* extends from the end of the flange 12*b* in the positive direction of the axis X to the end of the flange 12*a* in the positive direction of the axis X. Therefore, both ends of the winding 20 can be fixed to either the flange 12*a* or the flange 12*b*. For example, when an initial end portion of the winding 20 is fixed to the end of the flange 12*b* in the negative direction of axis X, and a terminal end portion of the winding 20 is fixed to the end of the flange 12*a* in the positive direction of the axis X, the winding 20 can be wound to form an odd number of layers. In contrast, when an initial end portion of the winding 20 is fixed to the end of the flange 12*b* in the negative direction of axis X, and a terminal end portion of the winding 20 is fixed to the end of the flange 12*b* in the positive direction of the axis X, the winding 20 can be wound to form an even number of layers. Thus, with the coil element 1, the length of the winding 20 can be readily set as compared to conventional coil elements in which the winding is wound to form an odd number of layers (one layer, three layers, five layers . . . ), and there is no need of winding the winding in vain. Accordingly, with the coil element 1, an inductance value can be readily adjusted.

The resin portion 40 is formed by filling a resin between the flange 12*a* and the flange 12*b*. The resin portion 40 covers at least a part of the winding 20. For example, the resin portion 40 may cover only the upper surface of the winding 20, so as to ensure or increase the fixation in mounting. Alternatively, the resin portion 40 may cover only the lower surface portion of the winding 20 (that is, the portion of the winding 20 opposed to the circuit board 2 in mounting), so as to allow the external electrode 30*a* and the external electrode 30*b* to extend to the resin portion 40. The resin portion 40 is composed of a resin or a resin containing a filler. The resin portion 40 is made of any resin material that is used to cover a winding in a wire-wound coil element. The filler is composed of either a magnetic material or a non-magnetic material. The filler is made of ferrite powder, magnetic metal particles, alumina particles, or silica particles so as to lower the coefficient of linear expansion and increase the mechanism strength of the resin portion 40.

The resin portion 40 is formed by, for example, applying the above described resin material to the portion between the flange 12*a* and the flange 12*b* by roller transfer, and pre-curing and then shaping the applied resin. The resin portion 40 is also formed by filling the above described resin material into the portion between the flange 12*a* and the flange 12*b* by molding, and precuring and then shaping the filled resin material. The resin portion 40 can be formed by various known methods. The resin portion 40 may cover the outside surfaces and the side surfaces of the flange 12*a* and the flange 12*b*, in addition to the portion between the flange 12*a* and the flange 12*b*.

In an embodiment of the present invention, a covering portion formed of a material other than resins is provided instead of the resin portion 40. The covering portion may be shaped and arranged in the same manner as the resin portion 40. The covering portion is made of a metal, ceramic, or other materials. The covering portion is formed by, for example, providing a foil, a plate, or a composite member including the foregoing made of a metal, ceramic, or other materials between the flange 12*a* and the flange 12*b*.

In an embodiment of the present invention, the coil element 1 is configured such that its dimension in the direction X is larger than its dimension in the direction Y. More specifically, the coil element 1 has a length (the dimension in the direction X) L1 of 1.0 to 6.0 mm, a width (the dimension in the direction Y) W1 of 0.5 to 4.5 mm, and a height (the dimension in the direction Z) H1 of 0.45 to 4.0 mm. When having a smaller size, the coil element 1 has a length (the dimension in the direction X) L1 of 1.0 to 2.0 mm, a width (the dimension in the direction Y) W1 of 0.5 to 1.6 mm, and a height (the dimension in the direction Z) H1 of 0.45 to 0.85 mm. The coil element 1 may be a so-called chip-like component. When the coil element 1 is a chip-like component, the coil element 1 has dimensions that satisfy L1/W1≥2. In another embodiment, the coil element 1 has dimensions that satisfy W1/H1>1. When the coil element 1 satisfies such a relationship, the coil element 1 can satisfy H1≤0.6 mm and can be extremely low-profile. These dimensions are mere examples, and a coil element to which the present invention can be applied can have any dimensions that conform to the purport of the present invention.

In an embodiment of the present invention, the axis A of the winding core 11 is parallel to the direction Y, as described above. Therefore, in an embodiment of the present invention, the winding core 11 extends along the short sides of the principal surface 1*c* (the principal surface 1*d*) of the coil element 1.

In an embodiment of the present invention, the drum core 10 has a length (the dimension in the direction X) L2 of 0.9 to 5.95 mm, a width (the dimension in the direction Y) W2 of 0.45 to 4.55 mm, and a height (the dimension in the direction Z) H2 of 0.4 to 3.95 mm.

In an embodiment of the present invention, the length W3 of the winding core 11 of the drum core 10 is 0.15 to 4.25 mm. The length W3 of the winding core 11 is equal to the distance between the two flanges, that is, the distance from the inside surface of the flange 12*a* to the inside surface of the flange 12*b*.

In an embodiment of the present invention, the dimension W4 of the flange 12*a* and the flange 12*b* of the drum core 10 in the direction parallel to the axis A of the winding core 11 (the dimension in the direction Y) is 0.15 to 1.00 mm. In an embodiment of the present invention, the height of the flange 12*a* and the flange 12*b* (the dimension in the direction perpendicular to the mounting surface of the circuit board 2) is equal to the height of the drum core 10 and is 0.4 to 3.95 mm. When having a smaller size, the dimension W4 of the flange 12*a* and the flange 12*b* of the drum core 10 in the direction parallel to the axis A of the winding core 11 (the dimension in the direction Y) is 0.15 to 0.25 mm. In an embodiment of the present invention, the height of the flange 12*a* and the flange 12*b* (the dimension in the direction perpendicular to the mounting surface of the circuit board 2) is equal to the height of the drum core 10 and is 0.4 to 0.8 mm. In an embodiment of the present invention, the length of the flange 12*a* and the flange 12*b* (the dimension in the direction X) is equal to the length of the drum core 10 and is 0.9 to 5.95 mm. When having a smaller size, the length of the flange 12*a* and the flange 12*b* is 0.9 to 1.95 mm. The flange 12*a* and the flange 12*b* may be configured such that the ratio of the height thereof (the dimension of the short sides) to the length thereof (the dimension of the long sides) is smaller than 0.25. Thus, a coil element having a small thickness can be obtained.

In an embodiment of the present invention, the flange 12*a* and the flange 12*b* are configured such that the thickness (height) H2 of these flanges in the direction Z is larger than the thickness W4 in the direction parallel to the axis A of the winding core 11.

The coil element 1 according to an embodiment of the present invention is configured such that the length W3 of the winding core 11 in the axial direction thereof is smaller than the distance L3 between the land portion 3*a* and the land portion 3*b*.

The dimensions of the drum core described above are mere examples, and a drum core used in a coil element to which the present invention can be applied can have any dimensions that conform to the purport of the present invention.

In an embodiment of the present invention, the winding core 11 is formed such that its axis A extends through the center of the flange 12*a* and the flange 12*b* in the direction X and the direction Z and the winding core 11 has a shape symmetrical with respect to the axis A. In an embodiment of the present invention, the winding core 11 and the flange 12*b* are configured such that the distance H3 between the upper surface 11*a* of the outer periphery of the winding core 11 and the top surface 10*c* of the drum core 10 (that is, the top surface of the flange 12*b*) is equal to or greater than the distance H4 between the lower surface 11*b* of the outer periphery of the winding core 11 and the bottom surface 10*d* of the drum core 10 (that is, the bottom surface of the flange 12*b*), and the distance L4 between the side surface 11*c* of the outer periphery of the winding core 11 and the end surface 10*a* of the drum core 10 (that is, one of the end surfaces of the flange 12*b*) is equal to or greater than the distance L5 between the side surface 11*d* of the outer periphery of the winding core 11 and the end surface 10*b* of the drum core 10 (that is, the other of the end surfaces of the flange 12*b*). The flange 12*a* may be configured in the same manner as the flange 12*b*. When the outer diameter of the winding core 11 is uneven in the direction of the axis A, the distance H3 between the upper surface 11*a* of the outer periphery of the winding core 11 and the top surface 10*c* of the drum core 10 (that is, the top surface of the flange 12*b*) refers to the height from the outer periphery of the winding core 11 at the middle of the winding core 11 in the direction of the axis A to the top surface 10*c* of the drum core 10 (that is, the top surface of the flange 12*b*). Likewise, the distances H4, L4, and L5 are also determined on the basis of the outer periphery at the middle of the winding core 11 in the direction of the axis A.

In an embodiment of the present invention, the winding core 11 is formed such that the distance H3 between the upper surface 11a of the outer periphery of the winding core 11 and the top surface 10c of the drum core 10 is equal to the distance L4 between the side surface 11c of the outer periphery of the winding core 11 and the end surface 10a of the drum core 10.

Figure 11:
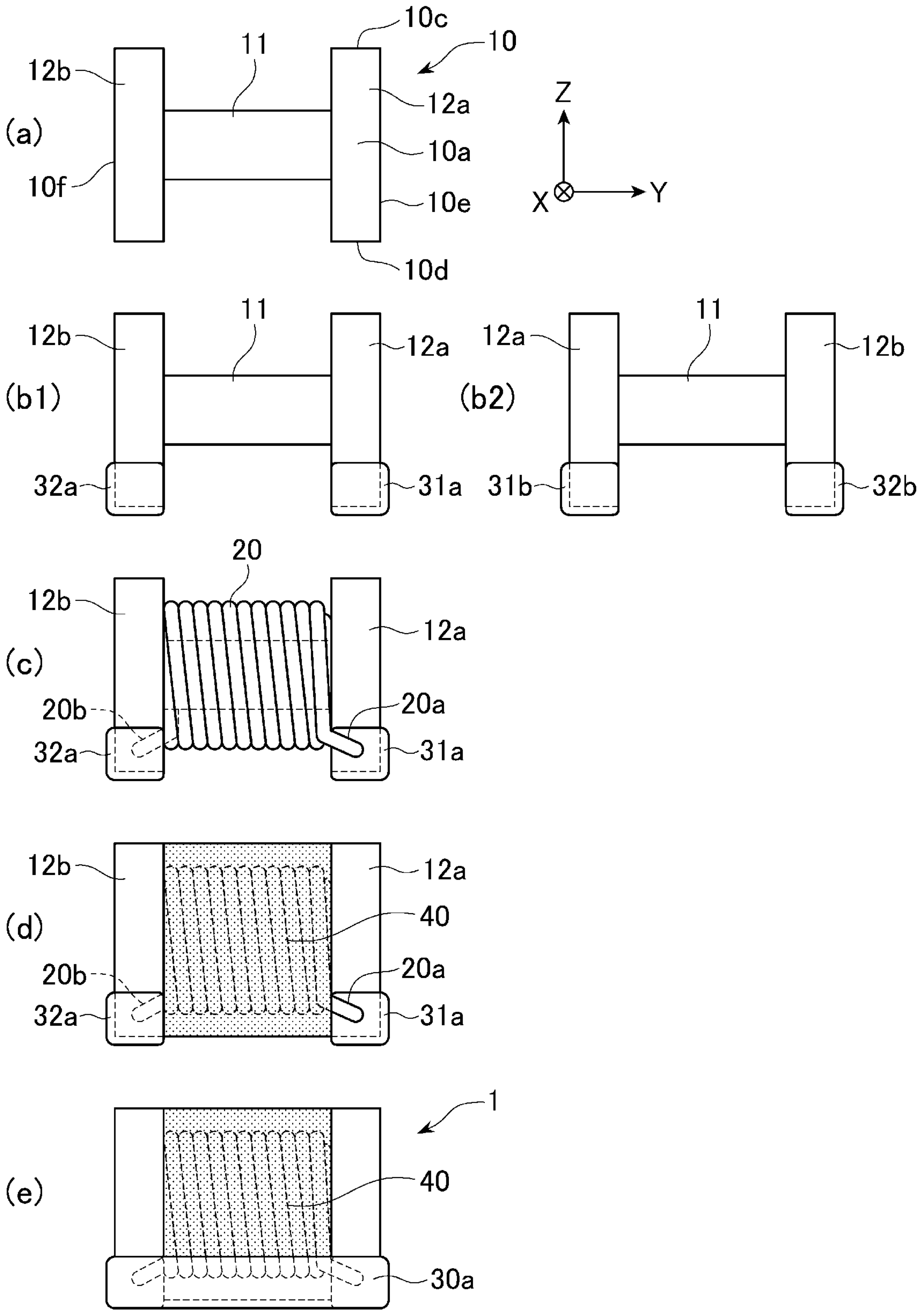
FIG. 11 is a schematic view showing a method of producing a coil element according to one embodiment of the present invention.

Next, with reference to FIG. 11, a description is given of a method of producing the coil element 1 according to an embodiment of the present invention. FIG. 11 is a schematic view showing a method of producing the coil element 1. In FIG. 11, Parts (a), (b1), and (c) to (e) schematically show the coil element 1 as viewed from the right side, and Part (b2) schematically show the coil element 1 as viewed from the left side.

First, as shown in Part (a) of FIG. 11, the drum core 10 is prepared. The drum core 10 may be produced by any known methods. For example, as disclosed in Japanese Patent Application Publication No. Hei 05-226156, the drum core 10 including the flanges 12a, 12b and the winding core 11 can be formed by press molding. Further, the drum core 10 including the flanges 12a, 12b and the winding core 11 can be formed by combining press molding with grinding of a mold having a rotational reference surface.

Next, a silver paste is adhered to the lower portions of the flange 12a and the flange 12b and the silver paste is dried, thereby to form a base electrode 31a on the end of the flange 12a facing the end surface 10a of the drum core 10 and form a base electrode 32a on the end of the flange 12b facing the end surface 10a of the drum core 10, as shown in Part (b1) of FIG. 11. The same step is performed to form a base electrode 31b on the end of the flange 12a facing the end surface 10b of the drum core 10 and form a base electrode 32b on the end of the flange 12b facing the end surface 10b of the drum core 10. In the example shown, the base electrode 31a and the base electrode 31b are formed on the lower portion of the flange 12a, and the base electrode 32a and the base electrode 32b are formed on the lower portion of the flange 12b. The base electrode 31a is formed on the flange 12a at a distance from the base electrode 31b in the direction X of the coil element 1. Likewise, the base electrode 32a is formed on the flange 12b at a distance from the base electrode 32b in the direction X of the coil element 1. In addition to dipping, each base electrode can be formed by various known methods such as brush coating, transfer, printing, thin film process, attachment of a metal plate, attachment of a metal tape, and the like.

Next, as shown in Part (c) of FIG. 11, the winding 20 is wound around the winding core 11 for a predetermined number of turns. One end 20a of the winding 20 is bonded to the base electrode 31a, the base electrode 32a, the base electrode 31b, or the base electrode 32b by thermocompression bonding, and the other end of the winding 20 is bonded to the base electrode 31a, the base electrode 32a, the base electrode 31b, or the base electrode 32b by thermocompression bonding. The winding 20 can also be fixed to the base electrodes by various known methods other than thermocompression bonding. For example, the winding 20 can be fixed to the corresponding base electrode by brazing with metal, adhesion with a heat resistant adhesive, pinching with a metal plate, or a combination thereof.

Next, as shown in Part (d) of FIG. 11, the resin portion 40 is formed between the flange 12a and the flange 12b so as to cover the winding 20. The resin portion 40 is formed by, for example, applying a resin material to the portion between the flange 12a and the flange 12b by roller transfer, and precuring and then shaping the applied resin. The resin portion 40 may be formed in only a part of the space between the flange 12a and the flange 12b. For example, the resin portion 40 may be filled into only the upper space of the winding 20 (that is, the positive side of the axis A in the direction Z in the space between the flange 12a and the flange 12b). As described above, the resin portion 40 may be formed by molding or other known methods. The external electrodes and the resin portion are flush with each other or form a concave surface in which the resin portion is recessed slightly.

The ends 20a, 20b of the winding 20 may be bonded by thermocompression bonding to the lower surfaces (the end surface in the negative direction of the axis Z) of the base electrode 31a or the base electrode 32a and the base electrode 31b or the base electrode 32b, respectively.

The resin portion 40 may also cover the outside surfaces and the side surfaces of the flange 12a and the flange 12b. In this case, the resin portion 40 is ground such that the ends 20a, 20b of the winding 20 are exposed to the lower surface side of the drum core 10. The exposed ends 20a, 20b of the winding 20 thus exposed are bonded by thermocompression bonding to the lower surfaces of the base electrodes 31 and the base electrodes 32.

Next, as shown in Part (e) of FIG. 11, the external electrode 30a is formed on the end of the drum core 10 on the end surface 10a side in the widthwise direction (direction X) by applying a silver paste to the bottom surface 10d and the region in the end surface 10a below a predetermined level. Likewise, the external electrode 30b is formed on the end of the drum core 10 on the end surface 10b side in the widthwise direction (direction X) by applying a silver paste to the bottom surface 10d and the region in the end surface 10b below a predetermined level. The external electrode 30a and the external electrode 30b are formed so as to be electrically connected to the base electrodes 31 and the base electrodes 32.

If necessary, the flange 12a and the flange 12b or a part of the resin portion 40 is ground. Thus, the coil element 1 having a smooth surface and a small thickness is produced.

The above described arrangement of the external electrode 30a and the external electrode 30b on the flange 12a and the flange 12b in the coil element 1 is a mere example. The external electrode 30a and the external electrode 30b can be arranged on the flange 12a and the flange 12b in a various manner. Variations of the external electrode 30a and the external electrode 30b will be hereinafter described with reference to FIGS. 12 to 19.

Figure 12:
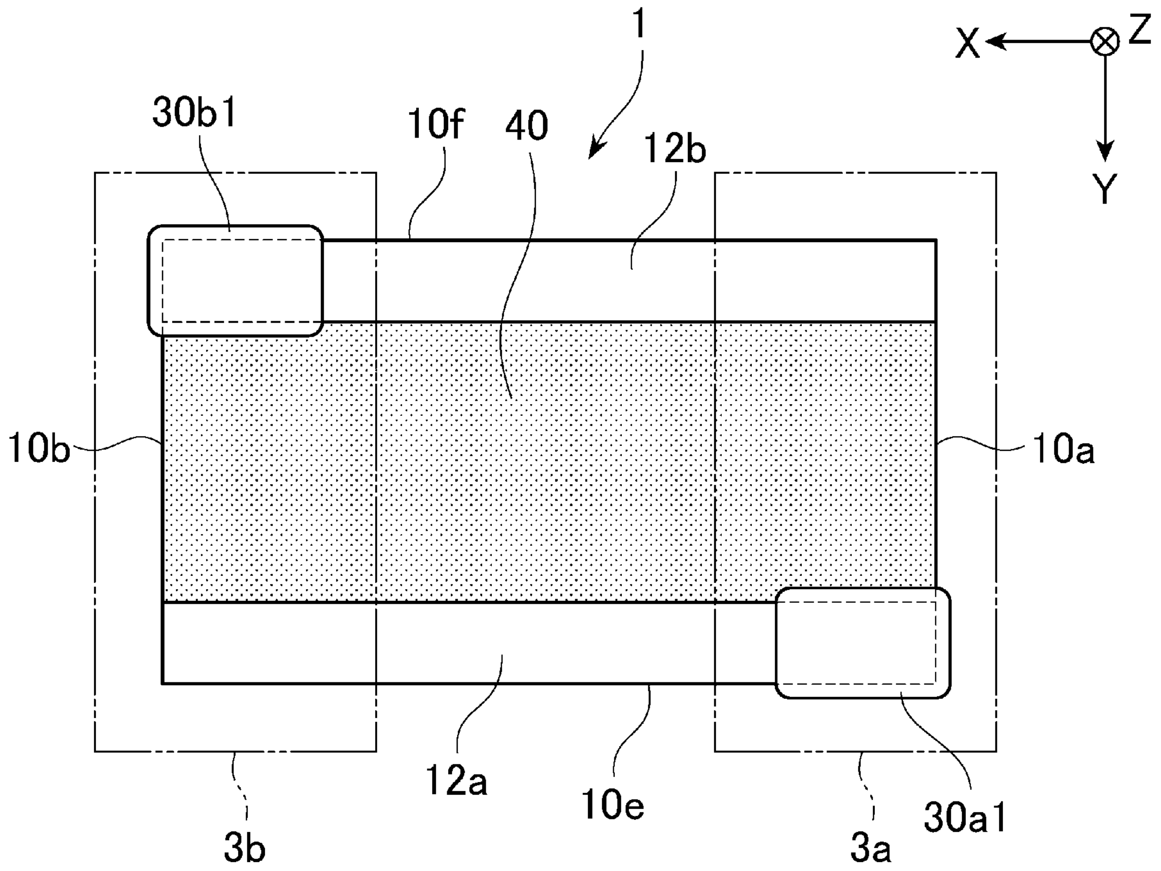
FIG. 12 is a bottom view showing a coil element according to another embodiment of the present invention.

When the end 20a of the winding 20 is connected to the base electrode 31a and the end 20b of the winding 20 is connected to the base electrode 32b, as shown in FIG. 12, the coil element 1 can include an external electrode 30a1 instead of the external electrode 30a and include an external electrode 30b1 instead of the external electrode 30b. The external electrode 30a1 covers the base electrode 31a. The external electrode 30a1 is different from the external electrode 30a in that it does not extend to the flange 12b. The external electrode 30b1 is provided on the end of the flange 12b on the side surface 10b side of the drum core 10 so as to cover the base electrode 32b. The external electrode 30b1 is different from the external electrode 30b in that it does not extend to the flange 12a.

Figure 13:
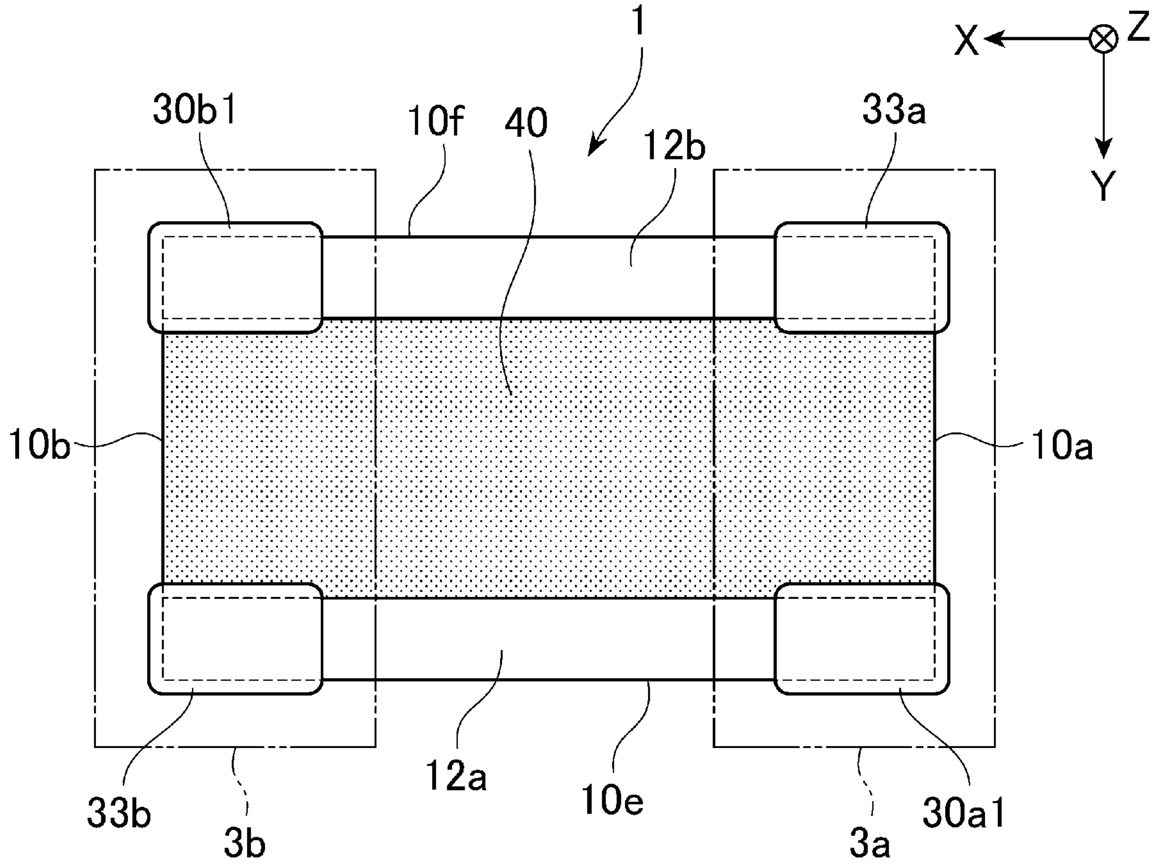
FIG. 13 is a bottom view showing a coil element according to still another embodiment of the present invention.

As shown in FIG. 13, the coil element 1 may include a dummy electrode 33a and a dummy electrode 33b, in addition to the constituents shown in FIG. 12. The dummy electrode 33a and the dummy electrode 33b may be made of the same material and have the same shape as the external electrode 30a1 and the external electrode 30b1. The dummy electrode 33*a* is provided on the end of the flange 12*b* on the side surface 10*a* side of the drum core 10. The dummy electrode 33*b* is provided on the end of the flange 12*a* on the side surface 10*b* side of the drum core 10. The winding 20 is not electrically connected to the dummy electrode 33*a* and the dummy electrode 33*b*. Since the dummy electrode 33*a* and the dummy electrode 33*b* are provided in this manner, the coil element 1 is supported at the four corners thereof by the land portion 3*a* and the land portion 3*b*, and therefore, the coil element 1 can be mounted to the circuit board 2 more stably.

Figure 14:
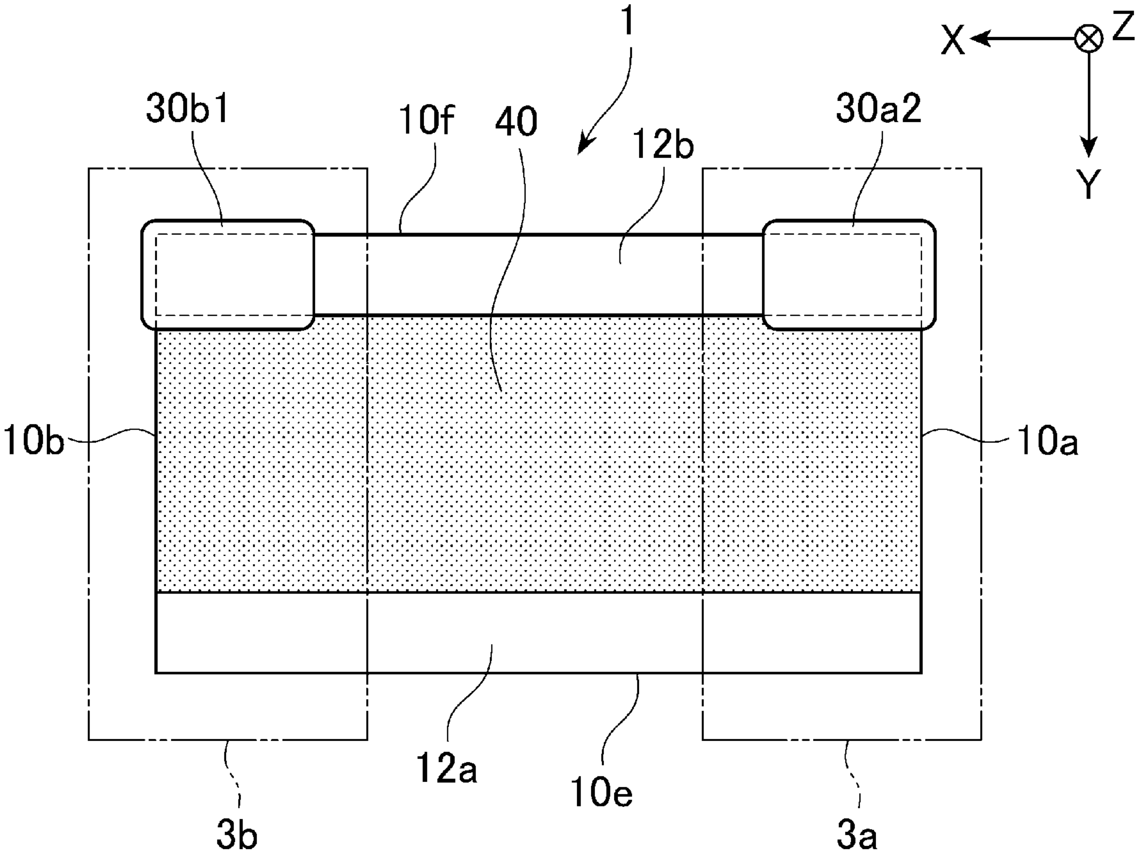
FIG. 14 is a bottom view showing a coil element according to still another embodiment of the present invention.

When the end 20*a* of the winding 20 is connected to the base electrode 32*a* and the end 20*b* of the winding 20 is connected to the base electrode 32*b*, as shown in FIG. 14, the coil element 1 can include an external electrode 30*a*2 instead of the external electrode 30*a*1. The external electrode 30*a*2 is provided on the end of the flange 12*b* on the side surface 10*a* side of the drum core 10 so as to cover the base electrode 32*a*. The external electrode 30*a*2 is different from the external electrode 30*a* in that it does not extend to the flange 12*b*.

Figure 15:
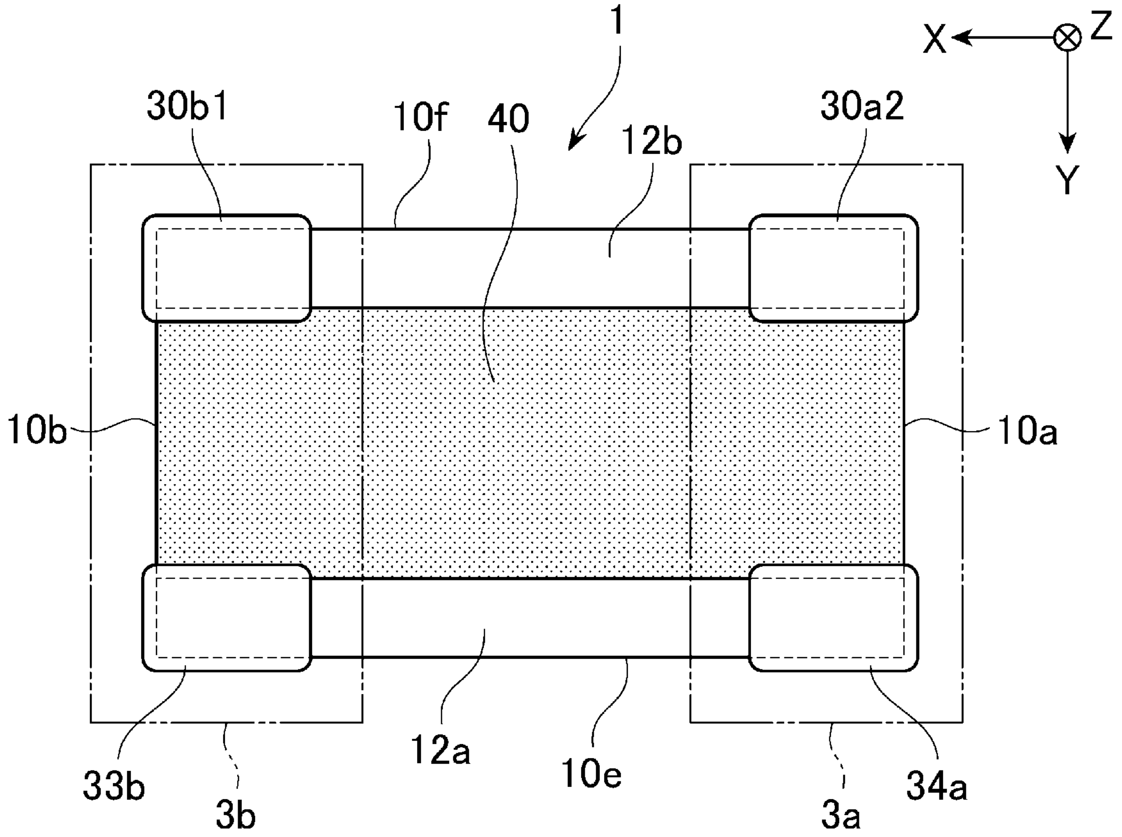
FIG. 15 is a bottom view showing a coil element according to still another embodiment of the present invention.

As shown in FIG. 15, the coil element 1 may include a dummy electrode 34*a* and a dummy electrode 33*b*, in addition to the constituents shown in FIG. 14. The dummy electrode 34*a* may be made of the same material and have the same shape as the external electrode 30*a*1 and the external electrode 30*b*1. The dummy electrode 34*a* is provided on the end of the flange 12*a* on the side surface 10*a* side of the drum core 10. The winding 20 is not electrically connected to the dummy electrode 34*a* and the dummy electrode 33*b*. Since the dummy electrode 34*a* and the dummy electrode 33*b* are provided in this manner, the coil element 1 is supported at the four corners thereof by the land portion 3*a* and the land portion 3*b*, and therefore, the coil element 1 can be mounted to the circuit board 2 more stably.

Figure 16:
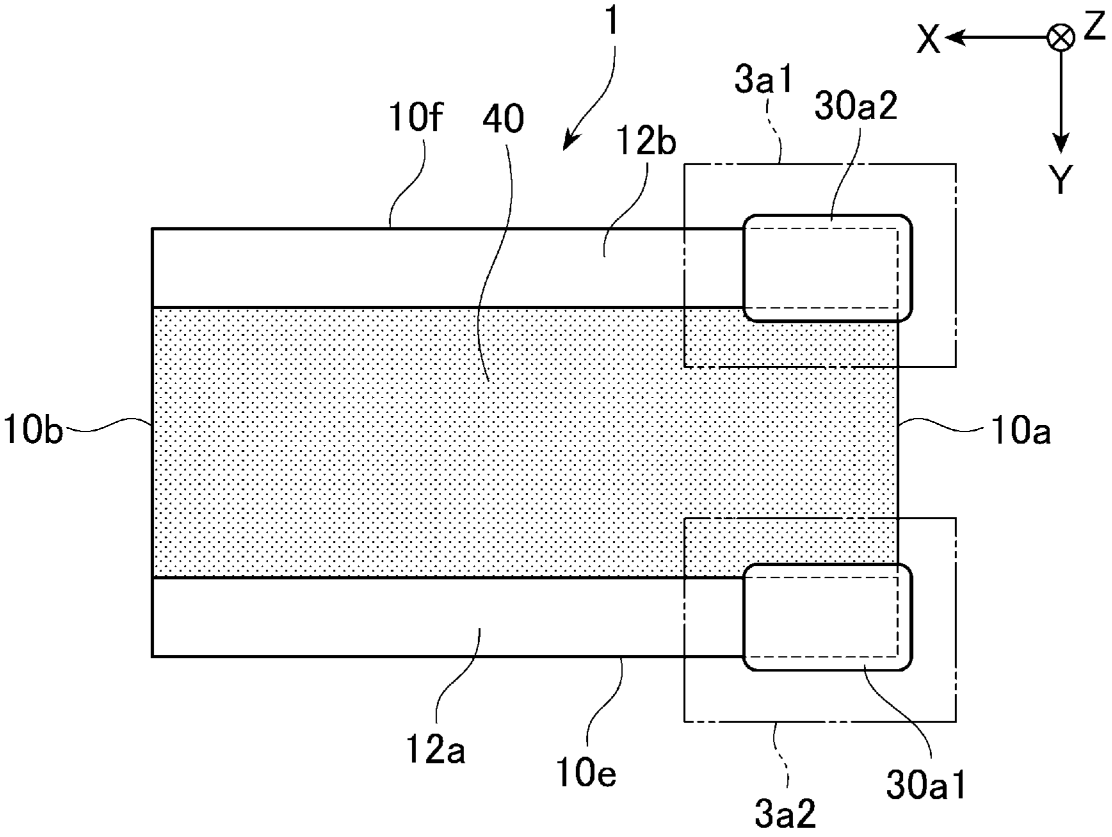
FIG. 16 is a bottom view showing a coil element according to still another embodiment of the present invention.

When the end 20*a* of the winding 20 is connected to the base electrode 31*a* and the end 20*b* of the winding 20 is connected to the base electrode 32*a*, as shown in FIG. 16, the coil element 1 can include an external electrode 30*a*2 instead of the external electrode 30*b*1 shown in FIG. 12. In the embodiment shown in FIG. 16, the circuit board 2 includes a land portion 3*a*1 instead of the land portion 3*a*, and includes a land portion 3*a*2 instead of the land portion 3*b*. The land portion 3*a*1 and the land portion 3*a*2 are separated from each other in the direction of axis Y.

Figure 17:
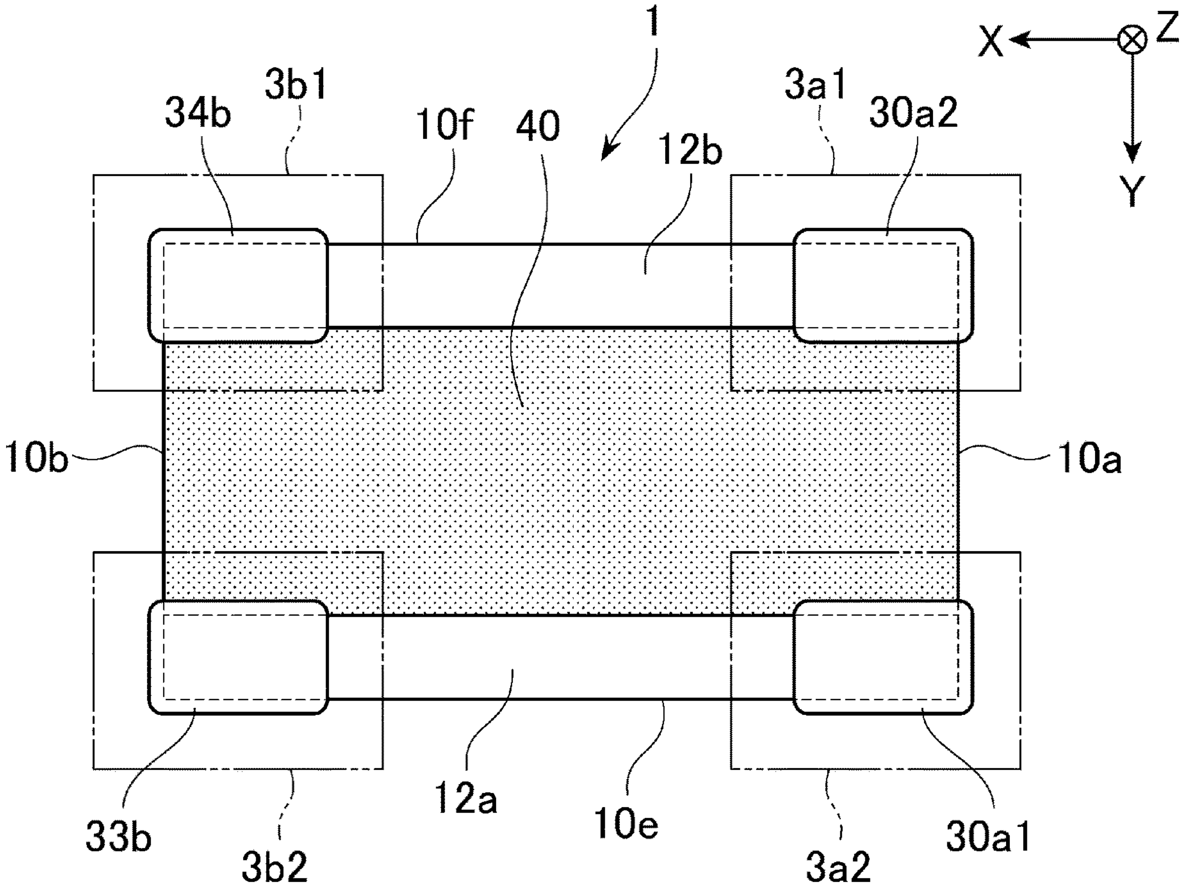
FIG. 17 is a bottom view showing a coil element according to still another embodiment of the present invention.

As shown in FIG. 17, the coil element 1 may include a dummy electrode 33*b* and a dummy electrode 34*b*, in addition to the constituents shown in FIG. 16. The dummy electrode 34*b* may be made of the same material and have the same shape as the external electrode 30*a*1 and the external electrode 30*b*1. The dummy electrode 34*b* is provided on the end of the flange 12*b* on the side surface 10*b* side of the drum core 10. The winding 20 is not electrically connected to the dummy electrode 33*b* and the dummy electrode 34*b*. Since the dummy electrode 33*b* and the dummy electrode 34*b* are provided in this manner, the coil element 1 can be mounted to the circuit board 2 more stably. Further, the circuit board 2 may include a dummy land portion 3*b*1 and a dummy land portion 3*b*2. When the dummy land portion 3*b*1 and the dummy land portion 3*b*2 are provided, the coil element 1 can be mounted to the circuit board 2 more stably.

Figure 18:
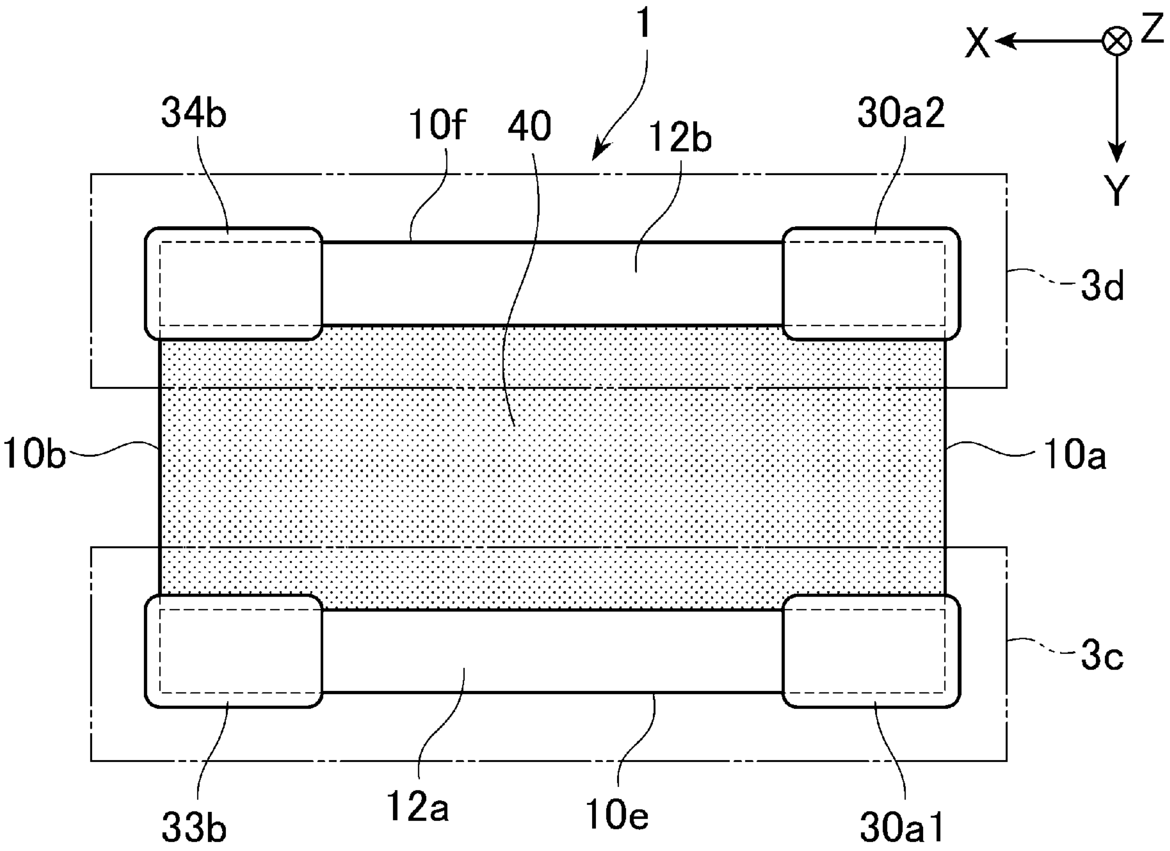
FIG. 18 is a bottom view showing a coil element according to still another embodiment of the present invention.
Figure 19:
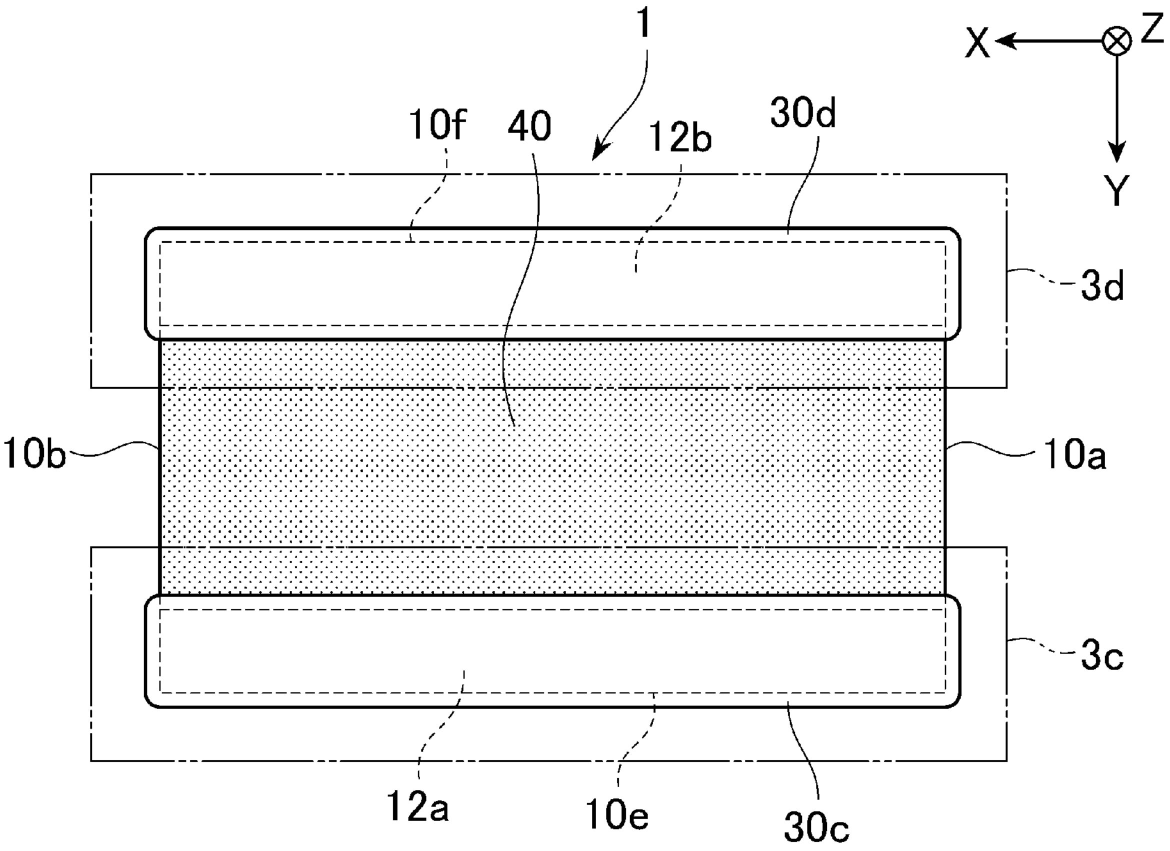
FIG. 19 is a bottom view showing a coil element according to still another embodiment of the present invention.

The shape and arrangement of the land portions shown in FIG. 17 can be modified as necessary. For example, as shown in FIG. 18, the circuit board 2 may include a land portion 3*c* and a land portion 3*d* that extend along the long sides of the coil element 1. The land portion 3*c* is configured and arranged so as to cover the entirety of the flange 12*a* in a bottom view, and the land portion 3*d* is configured and arranged so as to cover the entirety of the flange 12*b* in a bottom view When the end 20*a* of the winding 20 is connected to the base electrode 31*a* and the end 20*b* of the winding 20 is connected to the base electrode 32*a*, as shown in FIG. 19, the coil element 1 can include an external electrode 30*c* instead of the external electrode 30*a*1 shown in FIG. 16 and include an external electrode 30*d* instead of the external electrode 30*a*2. In the embodiment shown in FIG. 19, the external electrode 30*c* extends over the entire length of the bottom surface of the flange 12*a*, and the external electrode 30*d* extends over the entire length of the bottom surface of the flange 12*a*.

In the coil elements 1 shown in FIGS. 12, 13, and 16 to 19, one end 20*a* of the winding 20 is connected to the external electrode provided on the flange 12*a*, and the other end 20*b* is connected to the external electrode provided on the flange 12*b*. Therefore, in the coil elements 1 shown in these figures, the winding 20 is wound around the winding core 11 to form an odd number of layers (one layer, three layers, five layers . . . ). On the other hand, in the coil elements 1 shown in FIGS. 14 and 15, both the end 20*a* and the end 20*b* of the winding 20 are connected to the external electrode provided on the flange 12*b*. Therefore, in the coil elements 1 shown in these figures, the winding 20 is wound around the winding core 11 to form an even number of layers (two layers, four layers, six layers . . . ).

In the coil element 1 according to an embodiment of the present invention as described above, the axis A of the winding core 11 extends along the short sides (the sides in the direction Y) of the coil element 1. Therefore, the winding core is less prone to be broken as compared to coil elements configured such that the axis of the winding core extends in the longitudinal direction of the coil elements.

The coil element 1 according to an embodiment of the present invention is configured such that the length W3 of the winding core 11 in the axial direction thereof is smaller than the distance L3 between the land portion 3*a* and the land portion 3*b*. In conventional coil elements, a pair of flanges are arranged at positions corresponding to a pair of corresponding land portions, and therefore, the winding core connecting between the pair of flanges has a length equal to or greater than the distance between the pair of land portions. In the embodiment, the length W3 of the winding core 11 in the axial direction thereof is smaller than the distance L3 between the land portions, and therefore, the winding core 11 can be shorter than those in the conventional coil elements. Accordingly, the winding core 11 of the coil element 1 according to the embodiment is less prone to be broken due to a stress as compared to the conventional coil elements.

In the coil element 1 according to an embodiment of the present invention as described above, the flange 12*a* and the flange 12*b* are configured such that the thickness (height) H2 of these flanges in the direction Z is larger than the thickness W4 in the direction parallel to the axis A, and therefore, these flanges has a high deflection strength against a stress in the direction Z. Accordingly, even when a large stress acts on the coil element 1 in the direction Z (the direction perpendicular to the circuit board 2) in mounting the coil element 1 to the circuit board 2, the flange 12*a* and the flange 12*b* are less prone to be broken.

In the coil element 1 according to an embodiment of the present invention as described above, the flange 12*a* and the flange 12*b* connects between the first land portion 3*a* and the second land portion 3*b*. Accordingly, even when a large stress acts on the coil element 1 in the direction Z (the direction perpendicular to the circuit board 2) in mounting the coil element 1 to the circuit board 2, the flange 12*a* and the flange 12*b* can stop the stress. Thus, the coil element 1 has a high deflection strength against a stress in the direction Z.

In the coil element 1 according to an embodiment of the present invention as described above, the winding core 11 has an increased strength, and therefore, the coil element 1 can have a further smaller thickness. In addition, the distance H3 between the upper surface 11*a* of the outer periphery of the winding core 11 and the top surface 10*c* of the drum core 10 is equal to or greater than the distance H4 between the lower surface 11*b* of the outer periphery of the winding core 11 and the bottom surface 10*d* of the drum core 10, and therefore, there is less thermal impact in connecting the winding 20 with the external electrodes 30 or mounting the coil element 1 to the circuit board 2, or there is less electrical impact from the circuit board 2 after mounting the coil element 1 to the circuit board 2.

Further, when the distance L4 between the side surface 11*c* of the outer periphery of the winding core 11 and the end surface 10*a* of the drum core 10 is equal to the distance L5 between the side surface 11*d* of the outer periphery of the winding core 11 and the end surface 10*b* of the drum core 10, there is no need of adjusting the orientation of the drum core 10 in the direction X.

In the coil element 1 according to an embodiment of the present invention as described above, the winding core 11 has an increased strength, and therefore, the degree of freedom is high in design of a section perpendicular to the axis A of the winding core 11. Thus, for example, the diameter of the winding core 11 can be reduced to increase the capacity for receiving the winding 20. Accordingly, the winding 20 having a larger diameter can be used. Use of the winding 20 having a larger diameter can reduce the resistance value of the winding 20. The coil element having a small resistance value is suited for a power inductor.

Further, since the degree of freedom in design of a section perpendicular to the axis A of the winding core 11 is high, it is easy in the magnetic path passing the winding core 11, the flange 12*a*, and the flange 12*b* to uniform the sectional area of the winding core 11, the flange 12*a*, and the flange 12*b* perpendicular to the magnetic path.

Next, with reference to FIGS. 20 to 23, a description is given of a coil element 101 according to another embodiment of the present invention. The coil element 101 has four terminals. The coil element 101 has two windings insulated from each other and wound around the drum core 10, and in this respect, the coil element 101 is different from the coil element 1 having one winding 20 wound therein.

Figure 20:
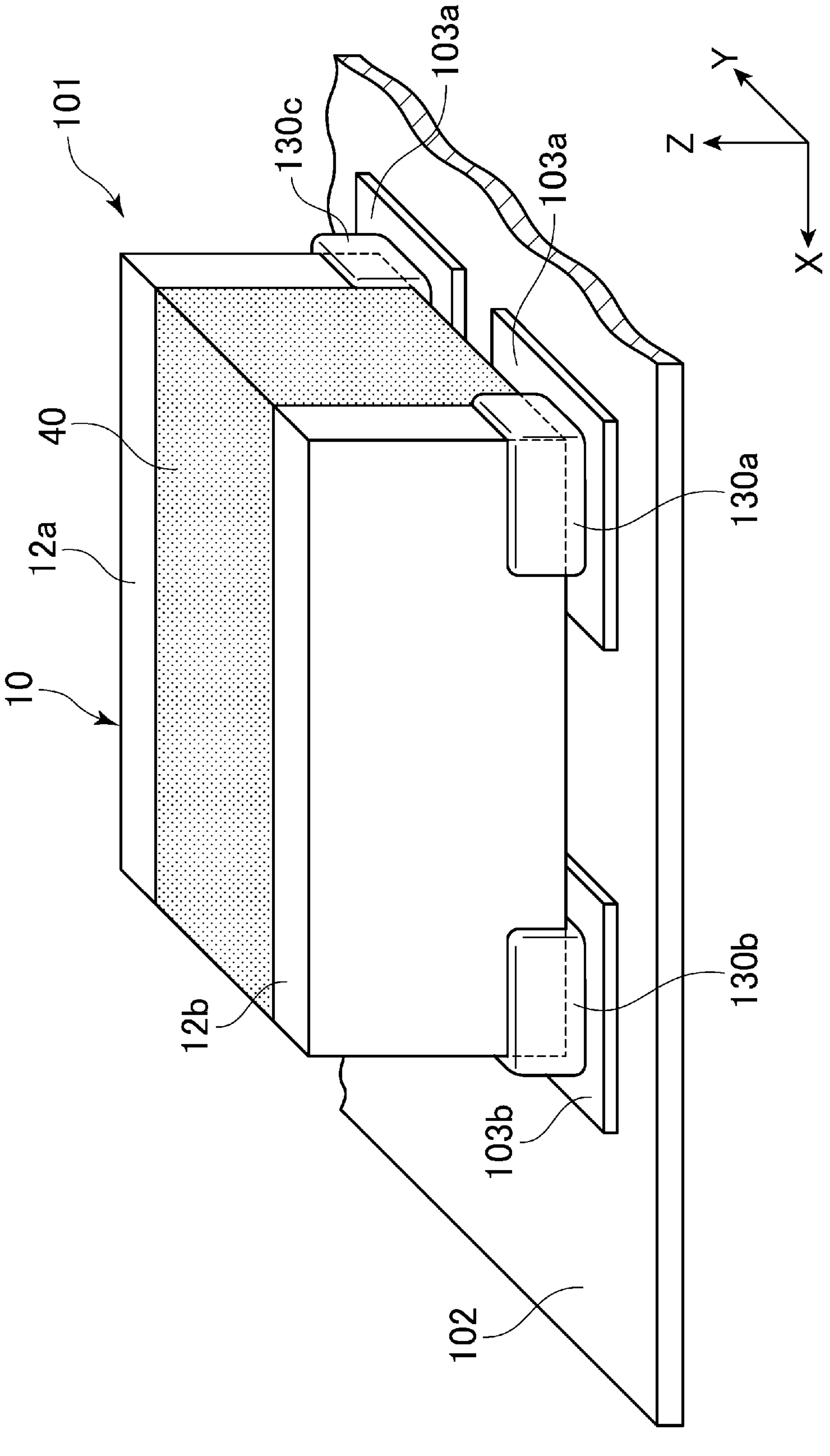
FIG. 20 is a perspective view showing a coil element according to another embodiment of the present invention.
Figure 21:
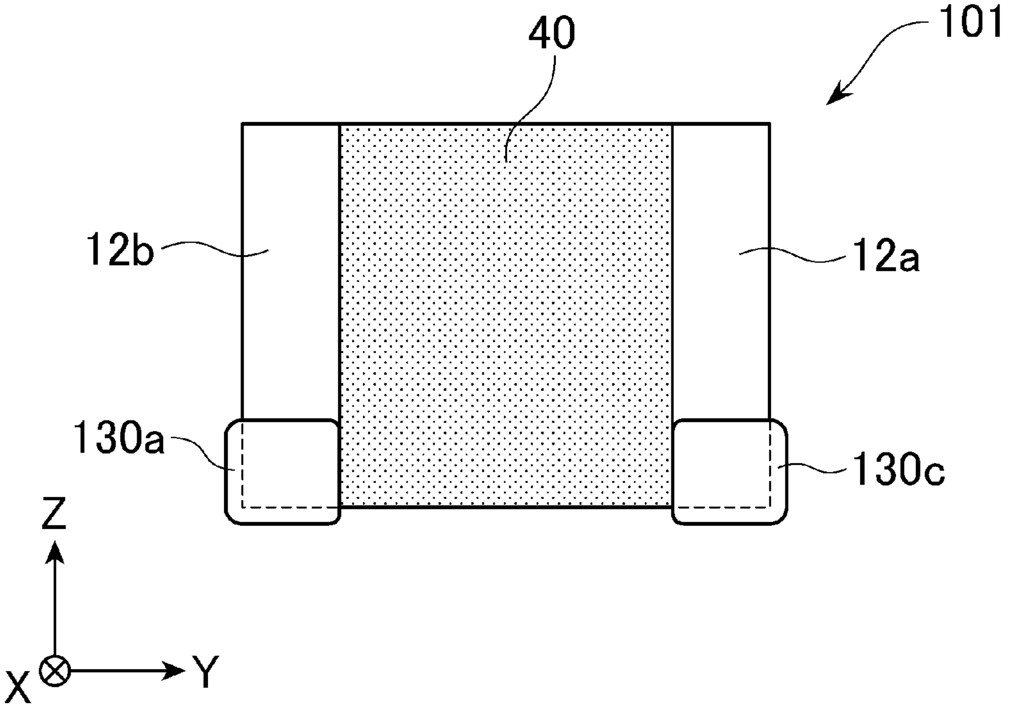
FIG. 21 is a right side view of the coil element shown in FIG. 20.
Figure 22:
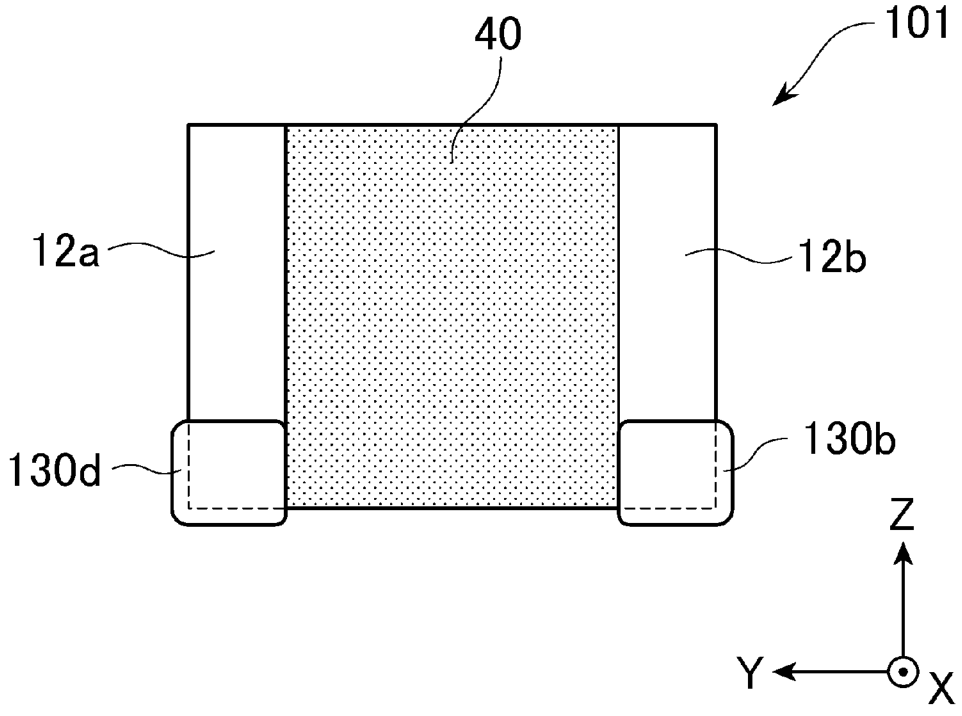
FIG. 22 is a left side view of the coil element shown in FIG. 20.
Figure 23:
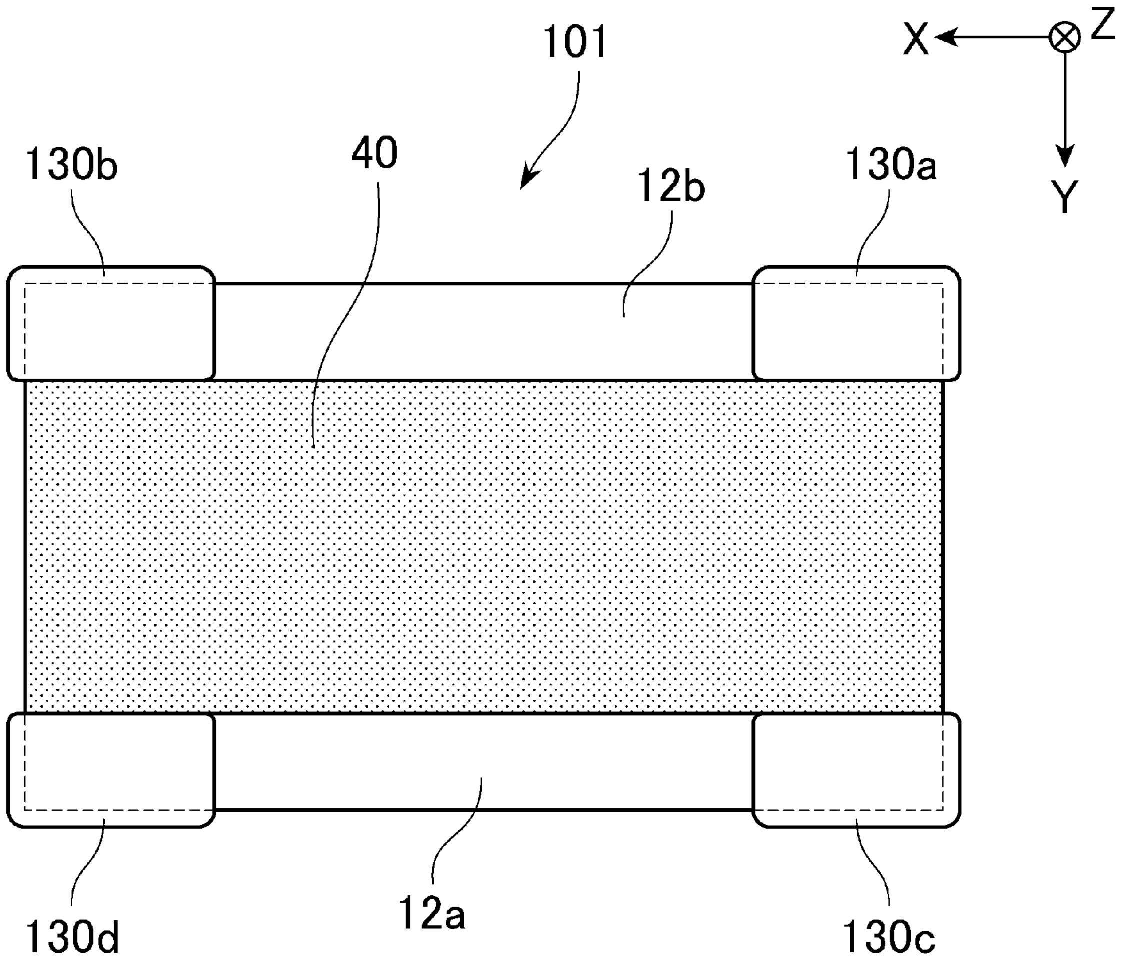
FIG. 23 is a bottom view of the coil element shown in FIG. 20.

FIG. 20 is a perspective view showing a coil element 101 according to another embodiment of the present invention; FIG. 21 is a right side view of the same; FIG. 22 is a left side view of the same; and FIG. 23 is a bottom view of the same.

As shown, the coil element 101 has four terminals, more specifically, an external electrode 130*a* provided on the end of the flange 12*b* in the negative direction of the X axis, an external electrode 130*b* provided on the end of the flange 12*b* in the positive direction of the X axis, an external electrode 130*c* provided on the end of the flange 12*a* in the negative direction of the X axis, and an external electrode 130*d* provided on the end of the flange 12*a* in the positive direction of the X axis.

Figure 24:
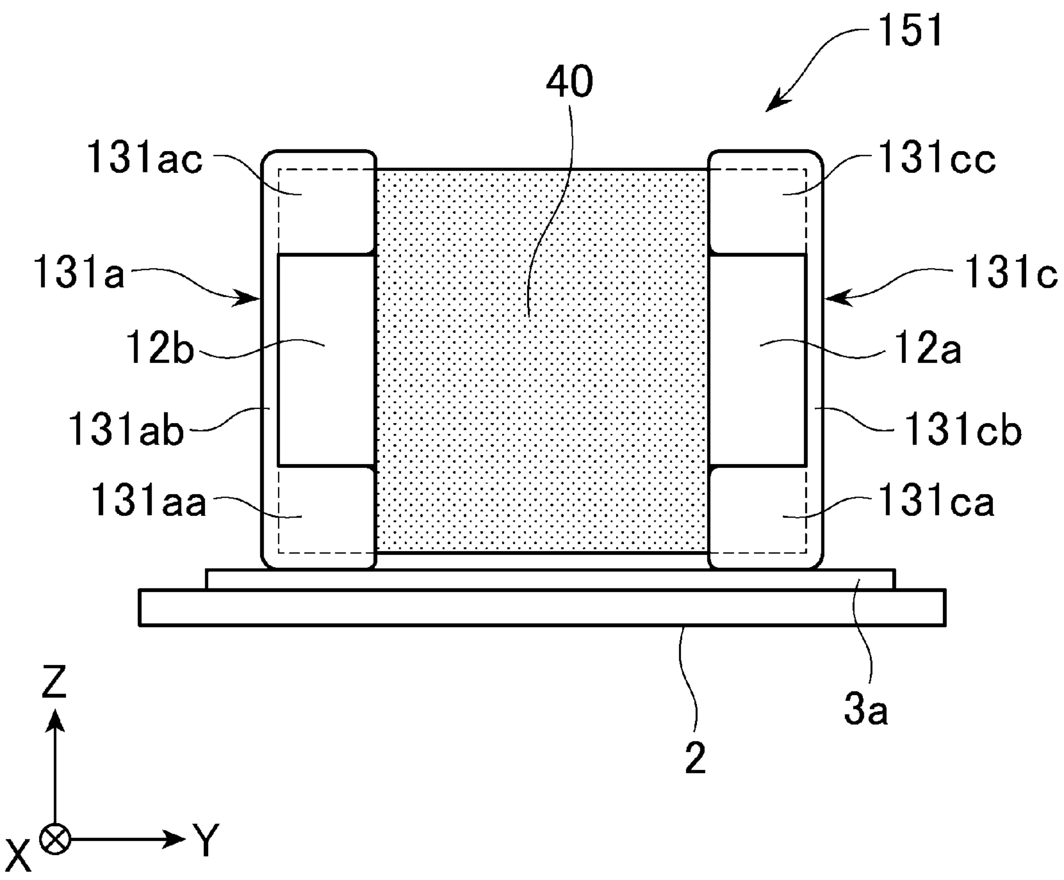
FIG. 24 is a right side view showing a coil element according to another embodiment of the present invention.
Figure 25:
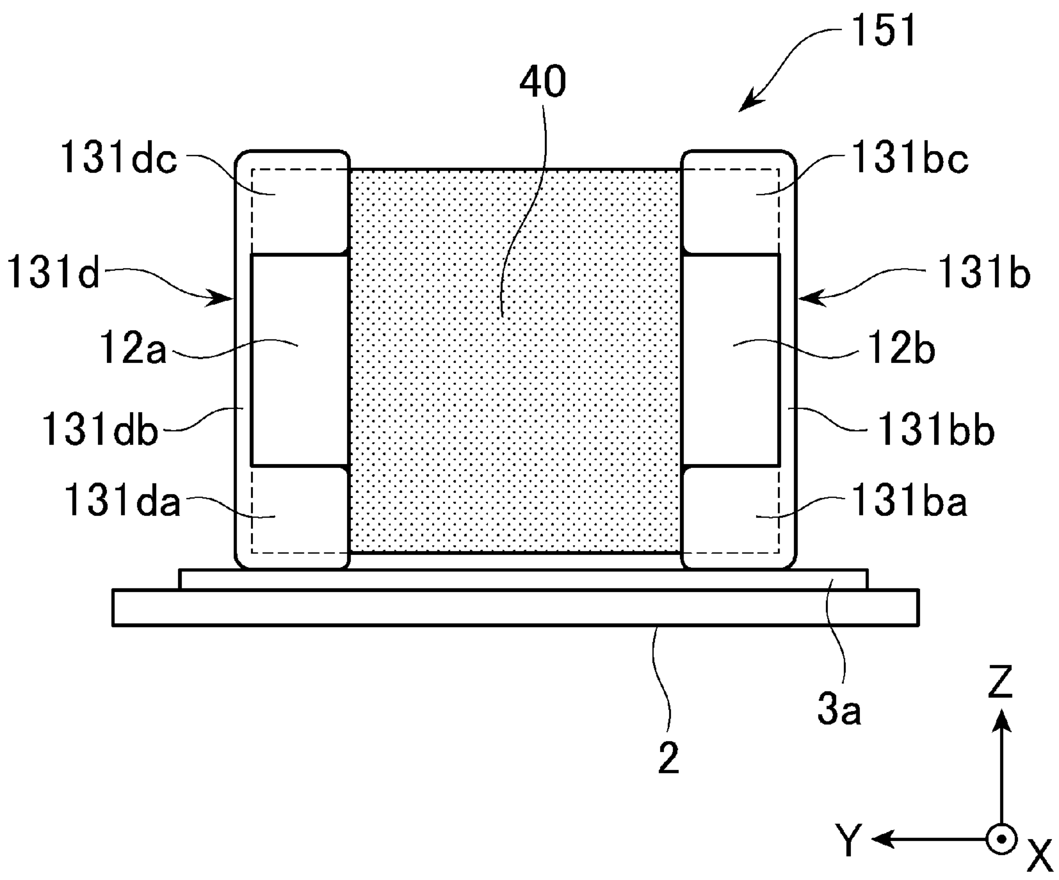
FIG. 25 is a left side view of the coil element shown in FIG. 24.
Figure 26:
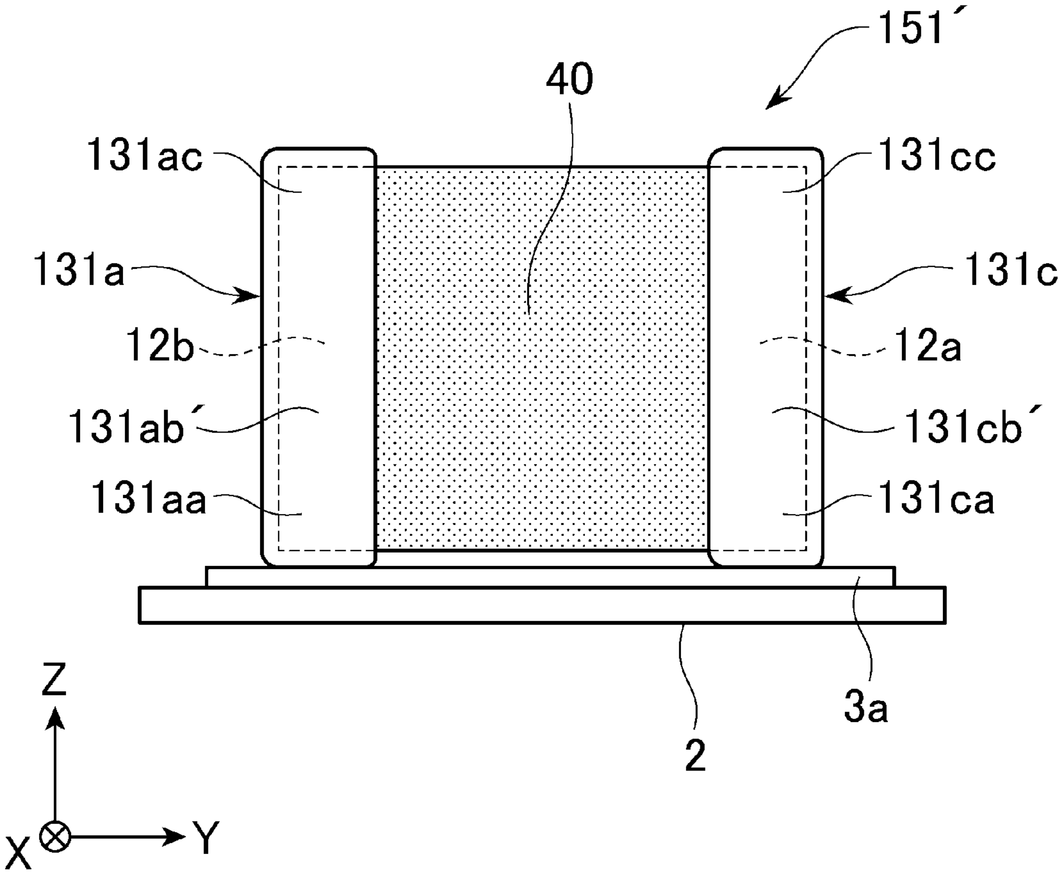
FIG. 26 is a right side view showing a coil element according to still another embodiment of the present invention.
Figure 27:
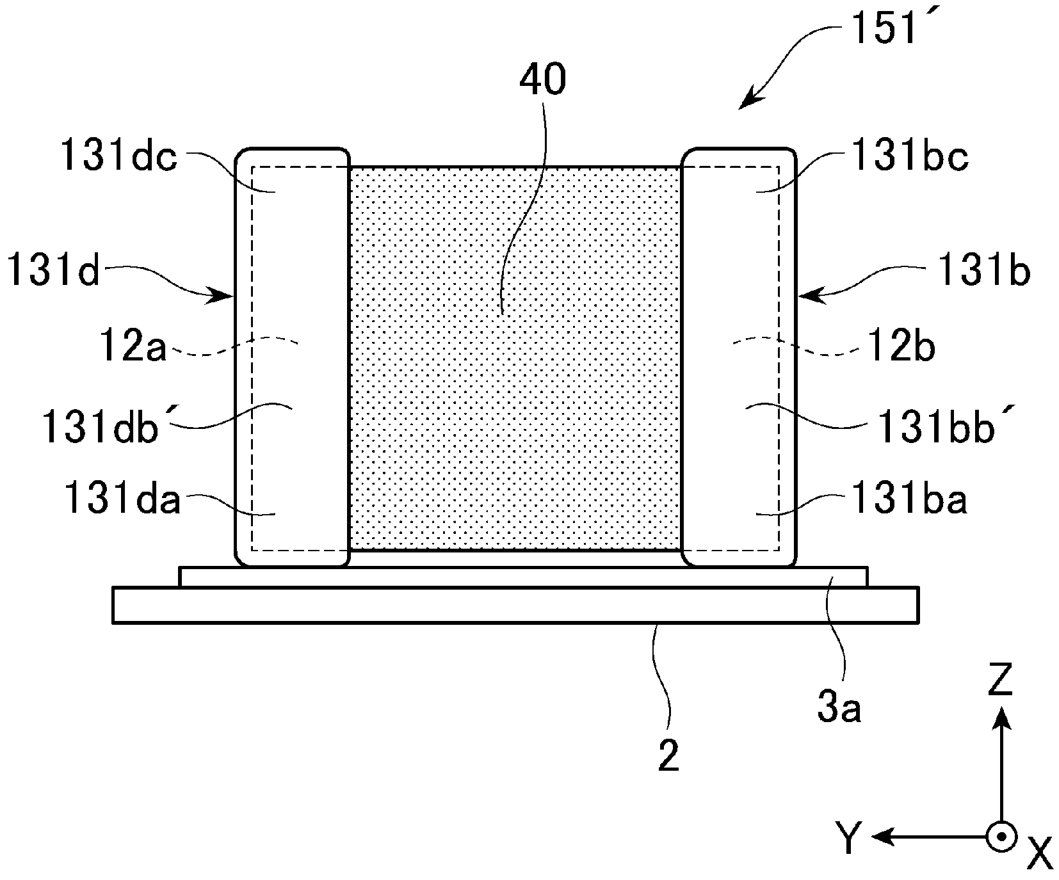
FIG. 27 is a left side view of the coil element shown in FIG. 26.

The shapes and the arrangement of the external electrode 130*a*, the external electrode 130*b*, the external electrode 130*c*, and the external electrode 130*d* shown are mere examples. These external electrodes can be shaped and arranged variously. Variations of the external electrodes that can be applied to the present invention will be hereinafter described with reference to FIGS. 24 to 27. FIG. 24 is a right side view showing a coil element according to another embodiment of the present invention, and FIG. 25 is a left side view of the coil element shown in FIG. 24. FIG. 26 is a right side view showing a coil element according to still another embodiment of the present invention, and FIG. 27 is a left side view of the coil element shown in FIG. 26.

As shown in FIGS. 24 and 25, the coil element 151 according to the other embodiment of the present invention includes an external electrode 131*a* instead of the external electrode 130*a* of the coil element 1, includes an external electrode 131*b* instead of the external electrode 130*b*, includes an external electrode 131*c* instead of the external electrode 130*c*, and includes an external electrode 131*d* instead of the external electrode 130*d*.

The external electrode 131*a* includes a bottom portion 131*aa*, a top portion 131*ac*, and a connection portion 131*ab* that connects between the bottom portion 131*aa* and the top portion 131*ac*. The bottom portion 131*aa* is provided on an end of the lower portion of the flange 12*b* in the negative direction of the axis X. The top portion 131*ac* is provided on an end of the upper portion of the flange 12*b* in the negative direction of the axis X. The connection portion 131*ab* extends, in the end of the side surface 10*f* in the negative direction of the axis X, from the upper end of the bottom portion 131*aa* to the lower end of the top portion 131*ac*.

The external electrode 131*b* includes a bottom portion 131*ba*, a top portion 131*bc*, and a connection portion 131*bb* that connects between the bottom portion 131*ba* and the top portion 131*bc*. The bottom portion 131*ba* is provided on an end of the lower portion of the flange 12*b* in the positive direction of the axis X. The top portion 131*bc* is provided on an end of the upper portion of the flange 12*b* in the positive direction of the axis X. The connection portion 131*bb* extends, in the end of the side surface 10*f* in the positive direction of the axis X, from the upper end of the bottom portion 131*ba* to the lower end of the top portion 131*bc*.

The external electrode 131*c* includes a bottom portion 131*ca*, a top portion 131*cc*, and a connection portion 131*cb* that connects between the bottom portion 131*ca* and the top portion 131*cc*. The bottom portion 131*ca* is provided on an end of the lower portion of the flange 12*a* in the negative direction of the axis X. The top portion 131*cc* is provided on an end of the upper portion of the flange 12*a* in the negative direction of the axis X. The connection portion 131*cb* extends, in the end of the side surface 10*e* in the negative direction of the axis X, from the upper end of the bottom portion 131*ca* to the lower end of the top portion 131*cc*.

The external electrode 131*d* includes a bottom portion 131*da*, a top portion 131*dc*, and a connection portion 131*db* that connects between the bottom portion 131*da* and the top portion 131*dc*. The bottom portion 131*da* is provided on an end of the lower portion of the flange 12*a* in the positive direction of the axis X. The top portion 131*dc* is provided on an end of the upper portion of the flange 12*a* in the positive direction of the axis X. The connection portion 131*db* extends, in the end of the side surface 10*e* in the positive direction of the axis X, from the upper end of the bottom portion 131*da* to the lower end of the top portion 131*dc*.

Thus, the coil element 151 has the external electrodes on both the top surface 1*c* and the bottom surface 1*d* thereof, and therefore, both the top surface 1*c* and the bottom surface 1*d* can serve as a mounting surface.

The circuit board 102 to which the coil element 101 is mounted has four land portions joined with the four external electrodes of the coil element 101. More specifically, the external electrodes 130*a*, 130*b*, 130*c*, and 130*d* are joined with the land portions 103*a*, 103*b*, 103*c*, and 103*d*, respectively, so as to mount the coil element 101 to the circuit board 102.

The arrangement of the external electrode 130*a*, the external electrode 130*b*, the external electrode 103*c*, and the external electrode 130*d* is a mere example. The external electrodes can be arranged at various positions on the flange 12*a* or the flange 12*b* in accordance with the arrangement of the land portions on the circuit board. The arrangement of the external electrode 130*a*, the external electrode 130*b*, the external electrode 103*c*, and the external electrode 130*d* may be provided on one of the flange 12*a* and the flange 12*b*, or a part of these external electrodes may be provided on the flange 12*a* with the others provided on the flange 12*b*. In addition to these external electrodes, dummy electrodes that are not electrically connected to the winding 20 may be provided. The dummy electrodes contribute to stable mounting of the coil element 101 to the circuit board 2.

Since the coil element 101 having four terminals has two windings electrically insulated from each other, the coil element 101 can be used as a common mode choke coil, a transformer, or other coil elements that are required to have a high coupling coefficient. A common mode choke coil, a transformer, or other coil elements that are required to have a high coupling coefficient are herein referred to collectively as "coupling coil elements."

When the coil element 101 is used as a transformer or a common mode choke coil, one end of a primary-side winding is electrically connected to the external conductor 130*a* provided on one end of the flange 12*b*, and the other end of the primary-side winding is electrically connected to the external conductor 130*b* provided on the other end of the flange 12*b*. Further, one end of a secondary-side winding is electrically connected to the external conductor 130*c* provided on one end of the flange 12*a*, and the other end of the secondary-side winding is electrically connected to the external conductor 130*d* provided on the other end of the flange 12*a*. It is also possible to connect the primary-side winding to the external electrode on the flange 12*a* side and connect the secondary-side winding to the external electrode on the flange 12*b* side.

When the coil element 101 is used as a transformer having an intermediate terminal, it is possible to provide an intermediate flange between the flange 12*a* and the flange 12*b* and provide an external electrode for serving as an intermediate terminal on the intermediate flange.

When the coil element 101 is used as a common mode choke coil having three windings, it is possible to provide an intermediate flange between the flange 12*a* and the flange 12*b* and provide an external electrode for the third winding on the intermediate flange. For example, C-PHY defined by the MIPI alliance stipulates that three signal lines per lane are used to differentially transmit a signal. The coil element 101 can be used as a common mode choke coil that conforms to C-PHY.

As is the coil element 1, the coil element 101 can also have a reduced thickness but is less prone to be broken. Since the coil element 101 is less prone to be broken, the coil element 101 can be readily downsized with necessary mechanical strength maintained. As described above, the flange 12*a* and the flange 12*b* may be configured such that the ratio of the height thereof (the dimension of the short sides) to the length thereof (the dimension of the long sides) is smaller than 0.25, thereby reducing the thickness of the coil element 101.

The dimensions, materials, and arrangements of the various constituents described in this specification are not limited to those explicitly described in the embodiments, and the various constituents can be modified to have any dimensions, materials, and arrangements within the scope of the present invention. The constituents other than those explicitly described herein can be added to the described embodiments; and part of the constituents described for the embodiments can be omitted.

What is claimed is:

1. A coil element having a rectangular parallelepiped shape and having a principal surface including long sides and short sides, the coil element comprising:

a drum core including a first flange, a second flange, and a winding core connecting between the first flange and the second flange;

a first winding wound around the winding core;

a first external electrode electrically connected to one end of the first winding;

a second external electrode electrically connected to the other end of the first winding; and a covering portion covering at least a part of the winding core, wherein the winding core extends along the short sides of the principal surface;

wherein the coil element has a height less than 0.85 mm, the height being a dimension of the first flange of the coil element in a direction perpendicular to the principal surface;

wherein the coil element has a width, the width being a dimension of the coil element in the direction parallel to the short sides of the principal surface and parallel to a central axis of the winding core, and the central axis of the winding core extends along the short sides of the principal surface;

wherein the first flange is provided at one end of the winding core in the direction parallel to the short sides of the principal surface and parallel to the central axis of the winding core, and the second flange is provided at another end of the winding core in the direction parallel to the short sides of the principal surface and parallel to the central axis of the winding core; and wherein the width in the direction parallel to the short sides of the principal surface is greater than the height.

2. The coil element of claim 1, wherein both the first external electrode and the second external electrode are provided on the first flange.

3. The coil element of claim 2, wherein the first external electrode is provided on one end of the first flange in a direction parallel to the long sides, and the second external electrode is provided on the other end of the first flange in the direction parallel to the long sides.

4. The coil element of claim 1, wherein the first external electrode is provided on the first flange and the second external electrode is provided on the second flange.

5. The coil element of claim 4, wherein the first flange has a first end and a second end opposed to each other in the direction parallel to the long sides, the second flange has a third end and a fourth end opposed to each other in the direction parallel to the long sides, the first flange and the second flange are arranged such that the first end and the third end are opposed to each other and the second end and the fourth end are opposed to each other, and the first external electrode is provided on the first end of the first flange, and the second external electrode is provided on the fourth end of the second flange.

6. The coil element of claim 4, wherein the first flange has a first end and a second end opposed to each other in the direction parallel to the long sides, the second flange has a third end and a fourth end opposed to each other in the direction parallel to the long sides, the first flange and the second flange are arranged such that the first end and the third end are opposed to each other and the second end and the fourth end are opposed to each other, and the first external electrode is provided on the first end of the first flange, and the second external electrode is provided on the third end of the second flange.

7. The coil element of claim 1, wherein the first external electrode extends from one end of the first flange to one end of the second flange, and the second external electrode extends from the other end of the first flange to the other end of the second flange.

8. The coil element of claim 1, further comprising a covering portion that covers at least a part of the first winding.

9. The coil element of claim 8, wherein the covering portion further covers at least a part of the drum core.

10. The coil element of claim 1, wherein a second winding wound around the winding core;

a third external electrode electrically connected to one end of the second winding; and a fourth external electrode electrically connected to the other end of the second winding, wherein each of the first external electrode and the third external electrode is provided on one end of the long sides of the principal surface, and each of the second external electrode and the fourth external electrode is provided on the other end of the long sides of the principal surface.

11. The coil element of claim 10, further comprising a covering portion that covers at least a part of the first winding, wherein the covering portion covers at least a part of the second winding.

12. The coil element of claim 1, wherein the distance between an outer periphery of the winding core and the first flange in a height direction of the coil element is equal to the distance between the outer periphery of the winding core and the first flange in a width direction of the coil element.

13. The coil element of claim 1, wherein the drum core is made of ferrite.

14. The coil element of claim 1, wherein the covering portion is made of a metal.

15. The coil element of claim 1, wherein the coil element is configured for horizontal mounting relative to a mounting surface of circuit board; and wherein the central axis of the winding core extends along and parallel to the short sides of the principal surface and in a direction parallel to said mounting surface upon mounting of the coil element.

16. A coupling coil element having a rectangular parallelepiped shape and having a principal surface including long sides and short sides, the coupling coil element comprising:

a drum core including a first flange, a second flange, and a winding core connecting between the first flange and the second flange;

a first winding wound around the winding core;

a second winding wound around the winding core;

a first external electrode electrically connected to one end of the first winding; and a second external electrode electrically connected to the other end of the first winding, a third external electrode electrically connected to one end of the second winding;

a fourth external electrode electrically connected to the other end of the second winding; and a covering portion covering at least a part of the winding core, wherein the winding core extends along the short sides of the principal surface;

wherein the coil element has a height less than 0.85 mm, the height being a dimension of the first flange of the coil element in a direction perpendicular to the principal surface; and wherein the coil element has a width, the width being a dimension of the coil element in the direction parallel to the short sides of the principal surface and parallel to a central axis of the winding core, and the central axis of the winding core extends along the short sides of the principal surface, wherein the first flange is provided at one end of the winding core in the direction parallel to the short sides of the principal surface and parallel to the central axis of the winding core, and the second flange is provided at another end of the winding core in the direction parallel to the short sides of the principal surface and parallel to the central axis of the winding core; and wherein the width in the direction parallel to the short sides of the principal surface is greater than the height.

17. The coupling coil element of claim 16, wherein the drum core further includes:

a third flange provided between the first flange and the second flange; and a fifth external electrode provided on the third flange.

18. The coil element of claim 16, wherein the drum core is made of ferrite.

19. The coil element of claim 16, wherein the covering portion is made of a metal.

20. The coil element of claim 1, wherein the coil element has a length, the length being a dimension of the coil element in the direction parallel to the long sides of the principal surface and perpendicular to the central axis of the winding core, and wherein the length is greater than the width.

* * * * *